US012610053B2

(12) United States Patent
Lin et al.

(10) Patent No.: US 12,610,053 B2
(45) Date of Patent: Apr. 21, 2026

(54) ENCODING METHOD AND APPARATUS, AND DECODING METHOD AND APPARATUS

(71) Applicant: HUAWEI TECHNOLOGIES CO., LTD., Shenzhen (CN)

(72) Inventors: Zehui Lin, Shenzhen (CN); Kangying Cai, Beijing (CN); Hu Chen, Munich (DE); Rong Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 18/884,281

(22) Filed: Sep. 13, 2024

(65) Prior Publication Data

US 2025/0008105 A1      Jan. 2, 2025

Related U.S. Application Data

(63) Continuation of application No. PCT/CN2023/072525, filed on Jan. 17, 2023.

(30) Foreign Application Priority Data

Mar. 15, 2022      (CN) .......................... 202210254653.7

(51) Int. Cl.
 *H04N 19/126*          (2014.01)
 *H04N 19/159*          (2014.01)
(52) U.S. Cl.
 CPC ......... *H04N 19/126* (2014.11); *H04N 19/159* (2014.11)

(58) Field of Classification Search
 CPC .......................... H04N 19/126; H04N 19/159
 See application file for complete search history.

(56) References Cited

U.S. PATENT DOCUMENTS

| | | | |
|---|---|---|---|
| 7,167,176 B2 * | 1/2007 | Sloan ..................... | G06T 15/50 |
| | | | 345/426 |
| 11,941,752 B2 * | 3/2024 | Stengel ................. | G06T 15/506 |

(Continued)

FOREIGN PATENT DOCUMENTS

CN          112755535  B   *  7/2022  ............. A63F 13/60

OTHER PUBLICATIONS

Michael Stengel et al:"A Distributed, Decoupled System for Losslessly Streaming Dynamic Light Probes to Thin Clients."arXiv:2103.05875v1 [cs.DC] Mar. 10, 2021 (Year: 2021).*

(Continued)

*Primary Examiner* — Dramos Kalapodas

(57)                ABSTRACT

Embodiments of the present disclosure relate to the field of media technologies, and disclose an encoding method and apparatus, and a decoding method and apparatus, to reduce a rendering loss caused by compression of probe data. The encoding method includes: first determining a target normalization combination of a probe data group, then normalizing the probe data group based on the target normalization combination to obtain a normalized probe data group, and encoding the normalized probe data group into a bitstream. The target normalization combination minimizes a rendering loss corresponding to the probe data group among a plurality of normalization combinations, and the target normalization combination includes a target normalization method and a target normalization parameter.

20 Claims, 13 Drawing Sheets

(56) References Cited

U.S. PATENT DOCUMENTS

| | | | | |
|---|---|---|---|---|
| 2018/0253869 A1* | 9/2018 | Yumer | .................. | G06T 11/001 |
| 2020/0275074 A1* | 8/2020 | Hamilton | ............. | H04N 13/161 |
| 2020/0388022 A1* | 12/2020 | Bourd | .................... | G06N 3/084 |
| 2021/0012562 A1* | 1/2021 | McGuire | ............... | G06T 15/506 |
| 2022/0414971 A1* | 12/2022 | Chang | ................... | G09G 5/363 |

OTHER PUBLICATIONS

Ari Silvennoinen and Peter-Pike Sloan:"Moving Basis Decomposition for Precomputed Light Transport."Jul. 15, 2021 (Year: 2021).*

Zina H. Cigolle et al:"A Survey of Efficient Representations for Independent Unit Vectors."Journal of Computer Graphics Techniques vol. 3, No. 2, Apr. 17, 2014 (Year: 2014).*

Ping Luo, et al,"Differentiable Learning-to-Normalize via Switchable Normalization", arXiv:1806.10779v3 [cs.CV] Jul. 3, 2018, total 13 pages.

Zina H. Cigolle et al:"A Survey of Efficient Representations for Independent Unit Vectors."Journal of Computer Graphics Techniques vol. 3, No. 2, Apr. 17, 2014. total 30 pages.

Michael Stengel et al:"A Distributed, Decoupled System for Losslessly Streaming Dynamic Light Probes to Thin Clients."arXiv:2103. 05875v1 [cs.DC] Mar. 10, 2021. total 13 pages.

Ari Silvennoinen and Peter-Pike Sloan:"Moving Basis Decomposition for Precomputed Light Transport."Jul. 15, 2021, total 11 pages.

* cited by examiner

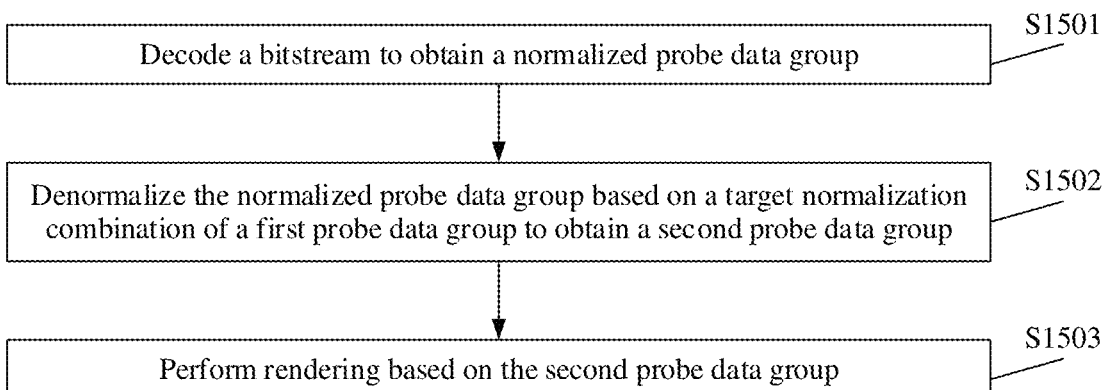

S1501

Decode a bitstream to obtain a normalized probe data group

S1502

Denormalize the normalized probe data group based on a target normalization combination of a first probe data group to obtain a second probe data group

S1503

Perform rendering based on the second probe data group

FIG. 15

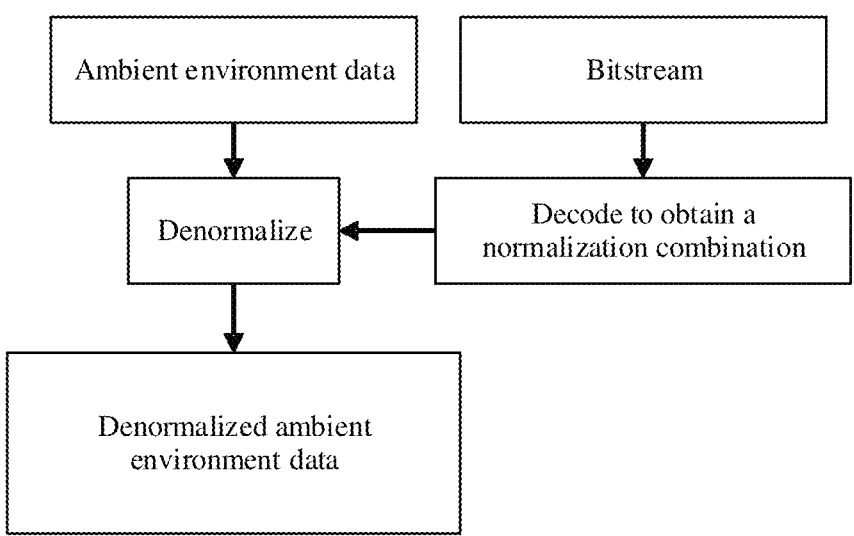

Ambient environment data

Bitstream

Denormalize

Decode to obtain a normalization combination

Denormalized ambient environment data

FIG. 16

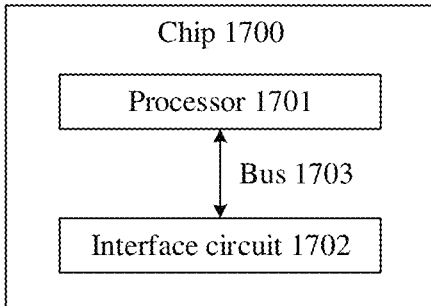

Chip 1700

Processor 1701

Bus 1703

Interface circuit 1702

FIG. 17

ENCODING METHOD AND APPARATUS, AND DECODING METHOD AND APPARATUS

CROSS-REFERENCE TO RELATED APPLICATIONS

This application is a continuation of International Application No. PCT/CN2023/072525, filed on Jan. 17, 2023, which claims priority to Chinese Patent Application No. 202210254653.7, filed on Mar. 15, 2022. The disclosures of the aforementioned applications are hereby incorporated by reference in their entireties.

TECHNICAL FIELD

Embodiments of the present disclosure relate to the field of media technologies, and in particular, to an encoding method and apparatus, and a decoding method and apparatus.

BACKGROUND

With development of software and hardware technologies, people's pursuit for an image generated by a computer rendering system is increasingly high, and gradually changes from only direct illumination in the past to effect of more illumination and more real illumination. A probe is one of common ways to simulate illumination effect in the rendering system. During actual application, there are usually tens of thousands of probes in a single scene, and there may even be hundreds of thousands of probes in a large-scale scene. Because probe data may be time-variant, a large quantity of overheads are caused when the probe data is stored, accessed, and transmitted. Therefore, the probe data needs to be compressed to reduce the overheads of storing, accessing, and transmitting the probe data.

However, compression of the probe data affects rendering effect and causes a rendering loss. How to reduce the rendering loss caused by compression of the probe data is one of urgent problems that need to be resolved by persons skilled in the art.

SUMMARY

Embodiments of the present disclosure provide an encoding method and apparatus, and a decoding method and apparatus, to reduce a rendering loss caused by compression of probe data. To achieve the foregoing objectives, the following technical solutions are used in embodiments of the present disclosure.

According to a first aspect, an embodiment of the present disclosure provides an encoding method. The method includes: first determining a target normalization combination of a probe data group, then normalizing the probe data group based on the target normalization combination to obtain a normalized probe data group, and encoding the normalized probe data group into a bitstream. The target normalization combination minimizes a rendering loss corresponding to the probe data group among a plurality of normalization combinations, and the target normalization combination includes a target normalization method and a target normalization parameter.

Probe data corresponds to one or more probes in a three-dimensional scene, and is used to determine shading effect on an object in the three-dimensional scene in a rendering process. The probe data group may include probe data of a single line of probes in one or more frames, probe data of a single probe in one or more frames, probe data of a single channel of probes in one or more frames, or probe data of all probes in one or more frames.

It can be learned that, in the encoding method provided in this embodiment, normalization is performed by selecting a combination that is of a normalization method and a normalization parameter and that minimizes a rendering loss corresponding to the probe data from a plurality of combinations of normalization methods and normalization parameters, instead of using a fixed normalization method and normalization parameter. Compared with using the fixed normalization method and normalization parameter, using the combination that is of the normalization method and the normalization parameter and that minimizes the rendering loss corresponding to the probe data for normalization can reduce the rendering loss caused by compression of the probe data.

Optionally, the rendering loss corresponding to the probe data group may be an error between rendering effect corresponding to the probe data group and rendering effect corresponding to the probe data group after encoding and decoding. For example, the rendering loss may be measured using a peak signal to noise ratio (PSNR), or may be measured using a mean squared error (MSE) or another parameter. This is not limited in this embodiment.

In a possible implementation, the determining a target normalization combination of a probe data group may include: determining a rendering loss that corresponds to each of the plurality of normalization combinations and that corresponds to the probe data group; and determining the normalization combination that is in the plurality of normalization combinations and that minimizes the rendering loss corresponding to the probe data group to be the target normalization combination.

It may be understood that the rendering loss that corresponds to each of the plurality of normalization combinations and that corresponds to the probe data group is determined, then the normalization combination that is in the plurality of normalization combinations and that minimizes the rendering loss corresponding to the probe data group is determined to be the target normalization combination, and then normalization is performed using the combination that is of the normalization method and the normalization parameter and that minimizes the rendering loss corresponding to the probe data (that is, the target normalization combination), to reduce the rendering loss caused by the compression (normalization) of the probe data.

In a possible implementation, the determining a rendering loss that corresponds to each of the plurality of normalization combinations and that corresponds to the probe data group may include: performing a target operation on the probe data group based on each normalization combination, to obtain a rendering result of the normalization combination on each probe data group; and determining, based on a rendering result obtained by rendering the probe data group through the target operation and a rendering result obtained by rendering the probe data group without the target operation, the rendering loss that corresponds to each normalization combination and that corresponds to the probe data group. The target operation includes normalization, coding, and denormalization.

A specific coding method may be any method that can be figured out by persons skilled in the art for processing. This is not limited in this embodiment. For example, a specific coding method may be high efficiency video coding (HEVC), analog coding, low resolution coding, fast coding, and the like.

It may be understood that the rendering result corresponding to each normalization combination can be obtained through the target operation on the probe data group based on each normalization combination, and then the rendering loss that corresponds to each normalization combination and that corresponds to the probe data group can be obtained by comparing the rendering result that is of the probe data group and that is obtained through the target operation with the rendering result that is of the probe data and that is obtained without the target operation. Then, normalization is performed based on the normalization combination that minimizes the rendering loss corresponding to the probe data, to reduce the rendering loss caused by compression (normalization) of the probe data.

In a possible implementation, the method may further include: encoding the target normalization combination into the bitstream.

It may be understood that after the target normalization combination of the probe data group is encoded into the bitstream, a decoder side may quickly obtain the target normalization combination of the probe data group by decoding the bitstream, and then denormalize the normalized probe data group based on the target normalization combination to obtain the probe data group.

In a possible implementation, the encoding the target normalization combination into the bitstream may include: when the probe data group is an intra coded probe data group, encoding the target normalization combination into the bitstream.

Intra coding is a coding scheme in which only information about a current frame is used when the current frame is coded. For example, HEVC intra coding may be used for intra coding of the probe data group. Inter coding is a coding scheme in which information about a non-current frame is used when the current frame is coded. For example, HEVC inter coding may be used for inter coding of the probe data group.

In a possible implementation, the method may further include: determining a normalization parameter variation of the probe data group based on the target normalization parameter of the probe data group and a reference target normalization parameter; and encoding the normalization parameter variation into the bitstream. The reference target normalization parameter is a target normalization parameter of a probe data group related to the probe data group.

Whether one probe data group is related to a current probe data group may be measured in a plurality of measurement manners. This is not limited in this embodiment. The measurement manners include but are not limited to: calculating a Pearson correlation coefficient between two probe data groups. If the Pearson correlation coefficient is greater than a second preset threshold, it is considered that one of the two probe data groups is correlated with the other group. In addition, a PSNR between two probe data groups may alternatively be calculated. If the PSNR is greater than a preset threshold, it is considered that one of the two probe data groups is correlated with the other group.

It may be understood that, compared with encoding the target normalization combination of the probe data group into the bitstream, encoding the normalization parameter variation of the probe data group into the bitstream can reduce overheads. In addition, after the normalization parameter variation of the probe data group is encoded into the bitstream, the decoder side may quickly obtain the normalization parameter variation of the probe data group by decoding the bitstream, then determine the target normalization combination of the probe data group based on the normalization parameter variation, and denormalize the normalized probe data group based on the target normalization combination to obtain the probe data group.

In a possible implementation, the encoding the normalization parameter variation into the bitstream may include: when the probe data group is an inter coded probe data group, encoding the normalization parameter variation into the bitstream.

In a possible implementation, the method may further include: determining a normalization parameter variation of the probe data group based on the target normalization parameter of the probe data group and a reference target normalization parameter, where the reference target normalization parameter is a target normalization parameter of a probe data group related to the probe data group; and encoding first information into the bitstream, where the first information indicates whether the target normalization parameter of the probe data group is changed compared with the reference target normalization parameter.

Optionally, the reference target normalization parameter of the probe data group in the current frame may be a target normalization parameter of a probe data group in a previous frame of the current frame.

Optionally, the first information may use different flags to indicate whether the target normalization parameter of the probe data group is changed compared with the reference target normalization parameter.

In a possible implementation, the method may further include: when the first information indicates that the target normalization parameter of the probe data group is changed compared with the reference target normalization parameter, encoding the normalization parameter variation into the bitstream.

It may be understood that, when the target normalization parameter of the probe data group is changed compared with the reference target normalization parameter, compared with encoding the target normalization combination of the probe data group into the bitstream, encoding the normalization parameter variation of the probe data group into the bitstream can reduce overheads. In addition, after the normalization parameter variation of the probe data group is encoded into the bitstream, the decoder side may quickly obtain the normalization parameter variation of the probe data group by decoding the bitstream, then determine the target normalization combination of the probe data group based on the normalization parameter variation, and denormalize the normalized probe data group based on the target normalization combination to obtain the probe data group.

In a possible implementation, the method may further include: encoding index information into the bitstream, where the index information includes an identifier of the probe data group and the normalization parameter variation of the probe data group.

In a possible implementation, the method may further include: determining a normalization parameter in the plurality of normalization combinations based on the reference target normalization parameter, where the reference target normalization parameter is the target normalization parameter of the probe data group related to the probe data group.

Optionally, the target normalization parameter of the probe data group may range from $1/(1+\epsilon)$ times to $1+\epsilon$ times the reference target normalization parameter. $\epsilon$ may range from 0.01 to 0.05.

Optionally, the plurality of normalization combinations may be normalization combinations including a min-max normalization method and a plurality of normalization parameters.

In a possible implementation, the normalization parameters may include a maximum normalization parameter and a minimum normalization parameter, and a normalization formula may meet:

$$\frac{\max(m, \min(x, M)) - m}{M - m},$$

where M is the maximum normalization parameter, and m is the minimum normalization parameter.

Optionally, the target normalization parameter (for example, M and m) of the probe data group in the current frame may range from $1/(1+\epsilon)$ times to $1+\epsilon$ times the target normalization parameter of the probe data group in the previous frame. $\epsilon$ may range from 0.01 to 0.05.

For example, it is assumed that a target normalization parameter M of the probe data group in the previous frame of the current frame is 1 and e is 0.01, a lower limit of a value range of the target normalization parameter M of the probe data group in the current frame is $1/(1+0.01)*1\approx0.99$, and an upper limit of the value range of the target normalization parameter M of the probe data in the current frame is $(1+0.01)*1=1.01$, that is, the value range of the target normalization parameter M of the probe data in the current frame is 0.99 to 1.01.

Optionally, the target normalization method may alternatively be another normalization method, for example, a preset maximum value normalization method or a standard score (Z-Score) normalization method.

Optionally, the probe data includes ambient environment data of the probe, and the ambient environment data includes at least one of the following: illumination data, a color, visibility data (including data such as distance data, a variance of the distance data, and a square of the distance data), a material, a normal direction, or texture coordinates.

It should be noted that the probe data includes the ambient environment data of the probe and attribute data of the probe. The attribute data of the probe usually occupies far less storage space than the ambient environment data. Therefore, the method provided in this embodiment may process only the ambient environment data of the probe.

According to a second aspect, an embodiment of the present disclosure further provides a decoding method. The method includes: first decoding a bitstream to obtain a normalized probe data group; then denormalizing the normalized probe data group based on a target normalization combination of a first probe data group to obtain a second probe data group; and performing rendering based on the second probe data group. The target normalization combination is a normalization combination that is in a plurality of normalization combinations and that corresponds to a smallest rendering loss corresponding to the first probe data group, the first probe data group is the normalized probe data group before normalization, and the target normalization combination includes a target normalization method and a target normalization parameter.

According to the decoding method provided in this embodiment, in a denormalization process, normalized probe data may be obtained by decoding the bitstream. Then, a combination that is of a normalization method and a normalization parameter and that minimizes a rendering loss corresponding to probe data is used for denormalization to obtain the probe data. Compared with using a fixed normalization method and normalization parameter for denormalization to obtain the probe data, using the normalization combination that minimizes the rendering loss corresponding to the probe data to obtain the probe data can cause a smaller rendering loss during rendering, and can reduce a rendering loss caused by compression of the probe data.

Optionally, the rendering loss corresponding to the probe data group may be an error between rendering effect corresponding to the probe data group and rendering effect corresponding to the probe data group after encoding and decoding. For example, the rendering loss may be measured using a peak signal to noise ratio (PSNR), or may be measured using a mean squared error (MSE) or another parameter. This is not limited in this embodiment.

In a possible implementation, the method may further include: obtaining the target normalization combination.

In a possible implementation, the obtaining the target normalization combination may include: obtaining target information, where the information includes the target normalization combination.

In another possible implementation, the obtaining the target normalization combination may include: decoding the bitstream to obtain the target normalization combination.

It can be learned that, according to the decoding method provided in this embodiment, the normalized probe data and the combination that is of the normalization method and the normalization parameter and that minimizes the rendering loss corresponding to the probe data may be obtained by decoding the bitstream. Then, the normalization combination is used for denormalization to obtain the probe data. Compared with using the fixed normalization method and normalization parameter for denormalization to obtain the probe data, using the normalization combination that minimizes the rendering loss corresponding to the probe data to obtain the probe data can cause the smaller rendering loss during rendering, and can reduce the rendering loss caused by compression of the probe data.

In a possible implementation, the obtaining the target normalization combination may include: decoding the bitstream to obtain a normalization parameter variation of the first probe data group; and determining the target normalization combination based on the normalization parameter variation and a reference normalization combination, where the reference normalization combination is a target normalization combination of a probe data group related to the first probe data group.

Optionally, the target normalization method in the target normalization combination may be the same as a target normalization method in the reference normalization combination.

It can be learned that, according to the decoding method provided in this embodiment, the normalized probe data and the normalization parameter variation may be obtained by decoding the bitstream, and then the combination that is of the normalization method and the normalization parameter and that minimizes the rendering loss corresponding to the probe data is obtained based on the normalization parameter variation and the reference normalization combination. Then, the normalization combination is used for denormalization to obtain the probe data. Compared with using the fixed normalization method and normalization parameter for denormalization to obtain the probe data, using the normalization combination that minimizes the rendering loss corresponding to the probe data to obtain the probe data can cause the smaller rendering loss during rendering, and can reduce the rendering loss caused by compression of the probe data.

In another possible implementation, the obtaining the target normalization combination may include: decoding the bitstream to obtain first information, where the first information indicates whether the target normalization parameter of the first probe data group is changed compared with a reference target normalization parameter, and the reference target normalization parameter is a target normalization parameter of a probe data group related to the first probe data group; and when the first information indicates that the target normalization parameter of the first probe data group is not changed compared with the reference target normalization parameter, determining the target normalization combination based on a reference normalization combination, where the reference normalization combination is a target normalization combination of the probe data group related to the first probe data group; or when the first information indicates that the target normalization parameter of the first probe data group is changed compared with the reference target normalization parameter, decoding the bitstream to obtain second information, where the second information indicates a normalization parameter variation of the first probe data group, and determining the target normalization combination based on the normalization parameter variation and the reference normalization combination.

Optionally, the target normalization combination may be the same as the reference normalization combination. For example, when the first information indicates that the target normalization parameter of the first probe data group is not changed compared with the reference target normalization parameter, the target normalization combination may be the same as the reference normalization combination.

It can be learned that, according to the decoding method provided in this embodiment, the normalized probe data and the target information may be obtained by decoding the bitstream, and then the combination that is of the normalization method and the normalization parameter and that minimizes the rendering loss corresponding to the probe data is obtained based on the target information. Then, the normalization combination is used for denormalization to obtain the probe data. Compared with using the fixed normalization method and normalization parameter for denormalization to obtain the probe data, using the normalization combination that minimizes the rendering loss corresponding to the probe data to obtain the probe data can cause the smaller rendering loss during rendering, and can reduce the rendering loss caused by compression of the probe data.

According to a third aspect, an embodiment of the present disclosure further provides an encoding apparatus. The apparatus includes: a data form conversion module and an encoding module. The data form conversion module is configured to: determine a target normalization combination of a probe data group, and normalize the probe data group based on the target normalization combination to obtain a normalized probe data group, where the target normalization combination minimizes a rendering loss corresponding to the probe data group among a plurality of normalization combinations, and the target normalization combination includes a target normalization method and a target normalization parameter. The encoding module is configured to encode the normalized probe data group into a bitstream.

In a possible implementation, the data form conversion module is configured to: determine a rendering loss that corresponds to each of the plurality of normalization combinations and that corresponds to the probe data group; and determine the normalization combination that is in the plurality of normalization combinations and that minimizes the rendering loss corresponding to the probe data group to be the target normalization combination.

In a possible implementation, the data form conversion module is configured to: perform a target operation on the probe data group based on each normalization combination, to obtain a rendering result of the normalization combination on each probe data group, where the target operation includes normalization, coding, and denormalization; and determine, based on a rendering result obtained by rendering the probe data group through the target operation and a rendering result obtained by rendering the probe data group without the target operation, the rendering loss that corresponds to each normalization combination and that corresponds to the probe data group.

In a possible implementation, the encoding module is further configured to encode the target normalization combination into the bitstream.

In a possible implementation, the data form conversion module is further configured to determine a normalization parameter variation of the probe data group based on the target normalization parameter of the probe data group and a reference target normalization parameter, where the reference target normalization parameter is a target normalization parameter of a probe data group related to the probe data group.

In a possible implementation, the encoding module is further configured to encode the normalization parameter variation into the bitstream.

In a possible implementation, the encoding module is further configured to encode first information into the bitstream, where the first information indicates whether the target normalization parameter of the probe data group is changed compared with the reference target normalization parameter.

In a possible implementation, the encoding module is further configured to: when the first information indicates that the target normalization parameter of the probe data group is changed compared with the reference target normalization parameter, encode the normalization parameter variation into the bitstream.

In a possible implementation, the encoding module is further configured to encode index information into the bitstream, where the index information includes an identifier of the probe data group and the normalization parameter variation of the probe data group.

In a possible implementation, the data form conversion module is further configured to determine a normalization parameter in the plurality of normalization combinations based on the reference target normalization parameter, where the reference target normalization parameter is the target normalization parameter of the probe data group related to the probe data group.

In a possible implementation, the probe data group includes ambient environment data of a probe, and the ambient environment data includes at least one of illumination data, a color, visibility data, a material, a normal direction, or texture coordinates.

According to a fourth aspect, an embodiment of the present disclosure further provides a decoding apparatus. The apparatus includes a decoding module and a data form conversion module. The decoding module is configured to decode a bitstream to obtain a normalized probe data group. The data form conversion module is configured to: denormalize the normalized probe data group based on a target normalization combination of a first probe data group to obtain a second probe data group, and perform rendering based on the second probe data group, where the target normalization combination is a normalization combination that is in a plurality of normalization combinations and that corresponds to a smallest rendering loss corresponding to the first probe data group, the first probe data group is the normalized probe data group before normalization, and the target normalization combination includes a target normalization method and a target normalization parameter.

In a possible implementation, the decoding module is further configured to obtain the target normalization combination.

In a possible implementation, the decoding module is configured to decode the bitstream to obtain the target normalization combination.

In a possible implementation, the decoding module is configured to: decode the bitstream to obtain a normalization parameter variation of the first probe data group; and determine the target normalization combination based on the normalization parameter variation and a reference normalization combination, where the reference normalization combination is a target normalization combination of a probe data group related to the first probe data group.

In a possible implementation, the decoding module is configured to: decode the bitstream to obtain first information, where the first information indicates whether the target normalization parameter of the first probe data group is changed compared with a reference target normalization parameter, and the reference target normalization parameter is a target normalization parameter of a probe data group related to the first probe data group; and when the first information indicates that the target normalization parameter of the first probe data group is not changed compared with the reference target normalization parameter, determine the target normalization combination based on a reference normalization combination, where the reference normalization combination is a target normalization combination of the probe data group related to the first probe data group; or when the first information indicates that the target normalization parameter of the first probe data group is changed compared with the reference target normalization parameter, decode the bitstream to obtain a normalization parameter variation of the first probe data group, and determine the target normalization combination based on the normalization parameter variation and the reference normalization combination.

According to a fifth aspect, an embodiment of the present disclosure further provides an encoding apparatus. The apparatus includes at least one processor, and when the at least one processor executes program code or instructions, the method according to the first aspect or any possible implementation of the first aspect is implemented.

Optionally, the apparatus may further include at least one memory, and the at least one memory is configured to store the program code or the instructions.

According to a sixth aspect, an embodiment of the present disclosure further provides a decoding apparatus. The apparatus includes at least one processor, and when the at least one processor executes program code or instructions, the method according to the second aspect or any possible implementation of the second aspect is implemented.

Optionally, the apparatus may further include at least one memory, and the at least one memory is configured to store the program code or the instructions.

According to a seventh aspect, an embodiment of the present disclosure further provides a chip, including an input interface, an output interface, and at least one processor. Optionally, the chip further includes a memory. The at least one processor is configured to execute code in the memory. When the at least one processor executes the code, the chip implements the method according to the first aspect or any possible implementation of the first aspect.

Optionally, the chip may be an integrated circuit.

According to an eighth aspect, an embodiment of the present disclosure further provides a computer-readable storage medium, configured to store a computer program. The computer program is configured to implement the method according to the first aspect or any possible implementation of the first aspect.

According to a ninth aspect, an embodiment of the present disclosure further provides a computer program product including instructions. When the computer program product runs on a computer, the computer is enabled to implement the method according to the first aspect or any possible implementation of the first aspect.

The encoding apparatus, the decoding apparatus, the computer storage medium, the computer program product, and the chip provided in embodiments are all configured to perform the encoding method and the decoding method provided above. Therefore, for beneficial effect that can be achieved by the encoding apparatus, the decoding apparatus, the computer storage medium, the computer program product, and the chip, refer to the beneficial effect in the encoding method and the decoding method provided above.

BRIEF DESCRIPTION OF DRAWINGS

To describe technical solutions in embodiments of the present disclosure more clearly, the following briefly describes accompanying drawings for describing embodiments. It is clear that the accompanying drawings in the following descriptions show merely some embodiments of the present disclosure, and persons of ordinary skill in the art may still derive other drawings from these accompanying drawings without creative efforts.

FIG. 15 is a schematic flowchart of a decoding method according to an embodiment of the present disclosure;

FIG. 16 is a schematic flowchart of another decoding method according to an embodiment of the present disclosure; and FIG. 17 is a diagram of a structure of a chip according to an embodiment of the present disclosure.

DESCRIPTION OF EMBODIMENTS

The following clearly describes the technical solutions of embodiments of the present disclosure with reference to the accompanying drawings in embodiments of the present disclosure. It is clear that the described embodiments are merely some but not all of embodiments of the present disclosure. All other embodiments obtained by persons of ordinary skill in the art based on embodiments of the present disclosure without creative efforts shall fall within the protection scope of embodiments of the present disclosure.

The term "and/or" in this specification describes only an association relationship for describing associated objects and represents that three relationships may exist. For example, A and/or B may represent the following three cases: Only A exists, both A and B exist, and only B exists.

In this specification and the accompanying drawings of embodiments of the present disclosure, the terms "first", "second", and the like are intended to distinguish between different objects or distinguish between different processing of a same object, but do not indicate a particular order of the objects.

In addition, the terms "including", "having", and any other variants thereof mentioned in descriptions of embodiments of the present disclosure are intended to cover a non-exclusive inclusion. For example, a process, a method, a system, a product, or a device that includes a series of steps or units is not limited to listed steps or units, but optionally further includes other unlisted steps or units, or optionally further includes another inherent step or unit of the process, the method, the product, or the device.

It should be noted that in the descriptions of embodiments of the present disclosure, the word "example" or "for example" is used to represent giving an example, an illustration, or a description. Any embodiment or design scheme described as an "example" or "for example" in embodiments of the present disclosure should not be explained as being more preferred or having more advantages than another embodiment or design scheme. Specifically, the words such as "example" or "for example" are used to present related concepts in a specific manner.

In descriptions of embodiments of the present disclosure, unless otherwise stated, "a plurality of" means two or more than two.

First, terms in embodiments of the present disclosure are explained.

Figure 3:
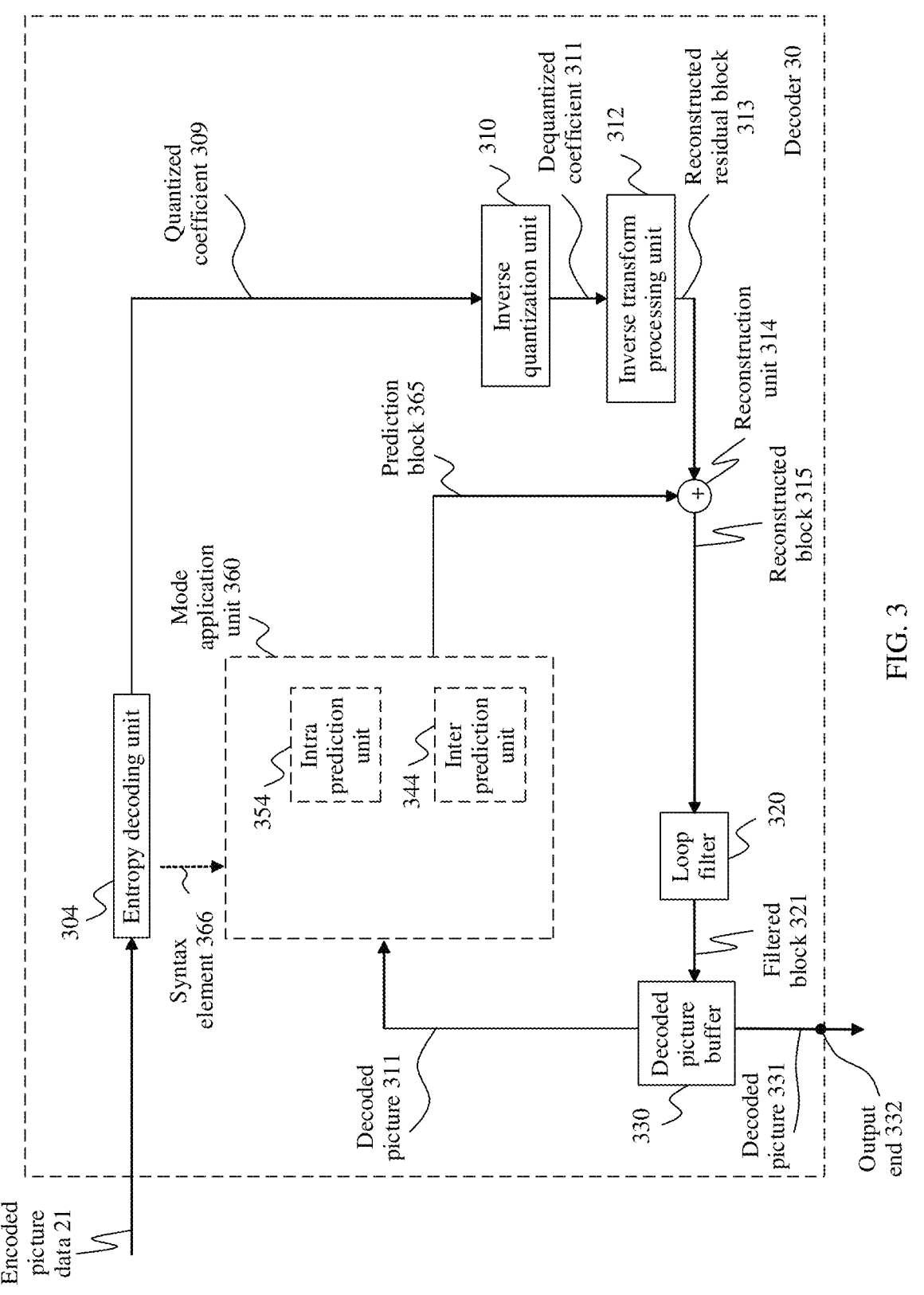
FIG. 3 is an example block diagram of a video decoder according to an embodiment of the present disclosure.

A reflection probe is a typical light probe that records illumination data: a situation of probe-centered illumination visible around the probe. The data is essentially data on a surface homeomorphic to a spherical surface, and may be spherical data or cube surface data, as shown in FIG. 3. In a usage scene, the reflection probe is disposed in a center of a metal sphere and bound to a metal spherical surface. During rendering, an emergent angle is calculated according to an algorithm, and then a value corresponding to the emergent angle is obtained from data stored in the probe to obtain an image that can be viewed after reflection.

Dynamic diffuse reflection global illumination (DDGI): A probe volume including a plurality of probes is used. When being used to record illumination, the probe volume is also referred to as a light field probe or an irradiance volume. In addition, the probe volume is also used in technologies such as precomputed radiance transfer. In the DDGI, each probe, similar to a reflection probe, records illumination of each angle. In addition, each probe further records visibility data, that is, distribution data of distances between the probe and objects at all angles, including data such as an average value of distances corresponding to each angle, squares of the distances, and a variance of the distances. DDGI data is stored in the following manner: Data of a single probe is unfolded into a square picture in a manner of unfolding an octahedron, and pictures of a plurality of probes are arranged into a large picture. A column of redundant boundary data is added to at an upper side, a lower side, a left side, and a right side of a square picture of each probe, to facilitate texture interpolation in use.

Normalization: A data range is limited during compression of probe data to delete some invalid data. During compression, transmission, and decompression of probe data, both whether to perform normalization and how to perform normalization affect rendering effect.

Preset maximum value normalization: Data x is changed to $$\hat{x} = \frac{\min\{x, M\}}{M},$$

where M is a preset maximum value, and data that exceeds the maximum value is truncated. The preset M may be a real number between 1 and 4. In this solution, M is a normalization parameter.

Min-max normalization: Data x is changed to $$\hat{x} = \frac{x - \min\{x\}}{\max\{x\} - \min\{x\}},$$

and normalized to a range of [0, 1]. Normalization parameters are $\max\{x\}$ and $\min\{x\}$. $\max\{x\}$ is a maximum value in the data x, and $\min\{x\}$ is a minimum value in the data x.

Z-Score normalization: Data x is changed to $$\hat{x} = \frac{x - \bar{x}}{\sigma},$$

where $\bar{x}$ is an average value of x, and $\sigma$ is a standard deviation of x. Normalization parameters are $\bar{x}$ and $\sigma$.

Data coding includes two parts: data encoding and data decoding. Data encoding is performed at a source side (or usually referred to as an encoder side), and usually includes processing (for example, compressing) raw data to reduce an amount of data required to represent the raw data (for more efficient storage and/or transmission). Data decoding is performed at a destination side (or usually referred to as a decoder side), and usually includes inverse processing relative to the encoder side, to reconstruct the raw data. "Coding" of data in embodiments of the present disclosure should be understood as "encoding" or "decoding" of the data. A combination of an encoding part and a decoding part is also referred to as a codec (encoder and decoder, codec).

For lossless data coding, data may be reconstructed, that is, reconstructed data has same quality as the raw data (it is assumed that there is no transmission loss or no other data losses during storage or transmission). For lossy data coding, further compression is performed, for example, through quantization, to reduce the amount of data required to represent the raw data, and the raw data cannot be fully reconstructed at the decoder side, that is, quality of reconstructed raw data is poorer or worse than quality of the raw data.

Embodiments of the present disclosure may be applied to video data, other data that has a compression/decompression requirement, and the like. The following describes embodiments of the present disclosure by using video data coding (video coding for short) as an example. For other types of data (for example, picture data, audio data, integral data, and other data that has a compression/decompression requirement), refer to the following descriptions. It should be noted that, compared with the video coding, in a process of coding data such as audio data and integral data, the data does not need to be partitioned into blocks, and may be directly coded.

Video coding usually indicates processing of a sequence of pictures that form a video or a video sequence. In the field of video coding, the terms "picture", "frame", and "image" may be used as synonyms.

Several video coding standards are used for "lossy hybrid video coding" (that is, spatial prediction and temporal prediction in a pixel domain are combined with 2D transform coding for applying quantization in a transform domain). Each picture of a video sequence is usually partitioned into a set of non-overlapping blocks, and coding is usually performed at a block level. To be specific, at an encoder, a video is usually processed, that is, encoded, at a block (video block) level. For example, a prediction block is generated through spatial (intra) prediction and temporal (inter) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to the encoder is applied to an encoded block or a compressed block to reconstruct the current block for representation. In addition, the encoder needs to repeat a processing step of a decoder, so that the encoder and the decoder generate same prediction (for example, intra prediction and inter prediction) and/or reconstructed pixels for processing, that is, coding, subsequent blocks.

In the following embodiments of a coding system 10, an encoder 20 and a decoder 30 are described based on FIG. 1a to FIG. 3.

Figure 1A:
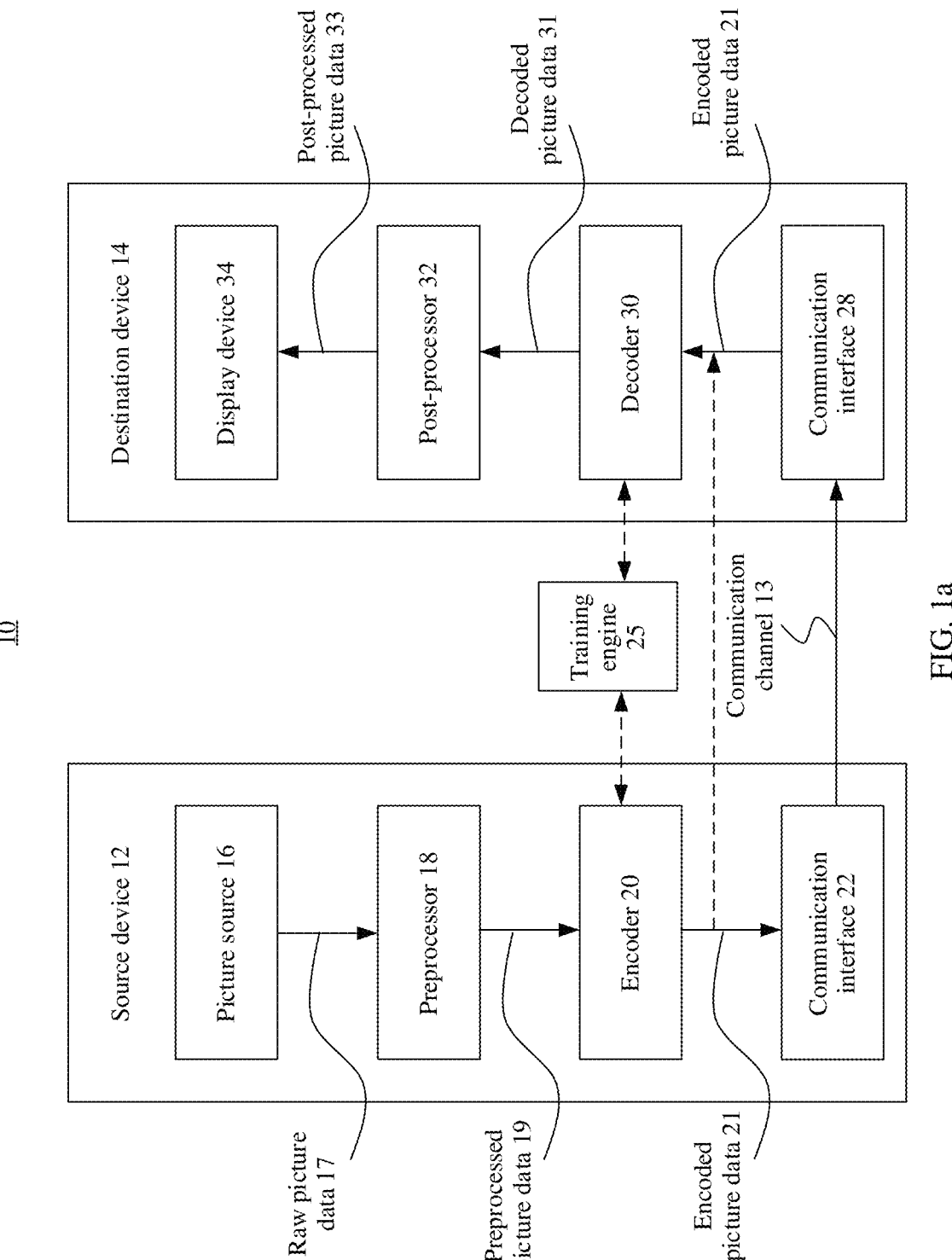
FIG. 1a is an example block diagram of a coding system according to an embodiment of the present disclosure.

FIG. 1a is an example block diagram of a coding system 10 according to an embodiment of the present disclosure, for example, a video coding system 10 (or referred to as a coding system 10 for short) that may use technologies in embodiments of the present disclosure. A video encoder 20 (or referred to as an encoder 20 for short) and a video decoder 30 (or referred to as a decoder 30 for short) in the video coding system 10 represent devices and the like that may be configured to perform technologies based on various examples described in embodiments of the present disclosure.

As shown in FIG. 1a, the coding system 10 includes a source device 12. The source device 12 is configured to provide encoded picture data 21 such as an encoded picture to a destination device 14 for decoding the encoded picture data 21.

The source device 12 includes the encoder 20, and may additionally, that is, optionally, include a picture source 16, a preprocessor (or a preprocessing unit) 18, for example, a picture preprocessor, and a communication interface (or a communication unit) 22.

The picture source 16 may include or be any type of picture capturing device configured to capture a real-world picture and the like, and/or any type of picture generation device, for example a computer graphics processing unit configured to generate a computer animated picture, or any type of device configured to obtain and/or provide a real-world picture, a computer generated picture, for example, screen content, a virtual reality (VR) picture, and/or any combination thereof (for example, an augmented reality (AR) picture). The picture source may be any type of memory or storage storing any of the foregoing pictures.

To distinguish processing performed by the preprocessor (or preprocessing unit) 18, a picture (or picture data) 17 may also be referred to as a raw picture (or raw picture data) 17.

The preprocessor 18 is configured to receive the raw picture data 17, and preprocess the raw picture data 17, to obtain a preprocessed picture (or preprocessed picture data) 19. preprocessing performed by the preprocessor 18 may, for example, include trimming, color format conversion (for example, from RGB to YCbCr), color correction, or denoising. It may be understood that the preprocessing unit 18 may be an optional component.

The video encoder (or encoder) 20 is configured to receive the preprocessed picture data 19 and provide the encoded picture data 21 (further details are described below, for example, based on FIG. 2).

The communication interface 22 in the source device 12 may be configured to receive the encoded picture data 21 and send, through a communication channel 13, the encoded picture data 21 (or any further processed version) to another device, for example, the destination device 14, or any other device, for storage or direct reconstruction.

The destination device 14 includes the decoder 30, and may additionally, that is, optionally, include a communication interface or communication unit 28, a post-processor (or post-processing unit) 32 and a display device 34.

The communication interface 28 in the destination device 14 is configured to receive the encoded picture data 21 (or any further processed version) directly from the source device 12 or any other source device such as a storage device. For example, the storage device is an encoded picture data storage device, and provides the encoded picture data 21 to the decoder 30.

The communication interface 22 and the communication interface 28 may be configured to send or receive the encoded picture data (or encoded data) 21 via a direct communication link between the source device 12 and the destination device 14, for example, a direct wired or wireless connection, or over any kind of network, for example, a wired or wireless network or any combination thereof, or any kind of private or public network, or any kind of combination thereof.

The communication interface 22 may be, for example, configured to package the encoded picture data 21 into an appropriate format, for example, a packet, and/or process the encoded picture data 21 using any type of transmission encoding or processing for transmission over a communication link or communication network.

The communication interface 28, corresponding to the communication interface 22, may be configured to, for example, receive transmitted data and process the transmitted data through any type of corresponding transmission decoding or processing and/or decapsulation, to obtain the encoded picture data 21.

Both the communication interface 22 and the communication interface 28 may be configured as unidirectional communication interfaces indicated by an arrow that corresponds to the communication channel 13 and that points from the source device 12 to the destination device 14 in FIG. 1a, or bi-directional communication interfaces, and may be configured to, for example, send and receive messages, to establish a connection, to determine and exchange any other information related to the communication link and/or data transmission such as transmission of the encoded picture data, and the like.

The video decoder (or decoder) 30 is configured to receive the encoded picture data 21 and provide decoded picture data 31 (further details are described below, for example, based on FIG. 3).

The post-processor 32 is configured to post-process the decoded picture data 31 (also called reconstructed picture data), for example, the decoded picture, to obtain post-processed picture data 33, for example, a post-processed picture. Post-processing performed by the post-processing unit 32 may include, for example, color format conversion (for example, conversion from YCbCr to RGB), color correction, trimming, re-sampling, or any other processing for generating the decoded picture data 31 for display by, for example, the display device 34.

The display device 34 is configured to receive the post-processed picture data 33 for displaying the picture, for example, to a user or viewer. The display device 34 may be or include any type of display for representing a reconstructed picture, for example, an integrated or external display or monitor. For example, the display may include a liquid crystal display (LCD), an organic light-emitting diode (OLED) display, a plasma display, a projector, a micro LED display, a liquid crystal on silicon (LCoS) display, a digital light processor (DLP), or any other type of display.

The coding system 10 further includes a training engine 25. The training engine 25 is configured to train the encoder 20 (especially an entropy encoding unit 270 in the encoder 20) or the decoder 30 (especially an entropy decoding unit 304 in the decoder 30), to perform entropy coding on a to-be-coded picture block based on estimated probability distribution obtained through estimation. For detailed descriptions of the training engine 25, refer to the following method embodiments.

Although FIG. 1a shows the source device 12 and the destination device 14 as separate devices, device embodiments may include both the source device 12 and the destination device 14, or include functions of both the source device 12 and the destination device 14, that is, include both the source device 12 or the corresponding function and the destination device 14 or the corresponding function. In these embodiments, the source device 12 or corresponding function and the destination device 14 or corresponding function may be implemented by using the same hardware and/or software or by separate hardware and/or software or any combination thereof.

According to the descriptions, existence and (accurate) splitting of different units or functions of the source device 12 and/or the destination device 14 shown in FIG. 1a may vary with an actual device and application. It is clear for a skilled person.

Figure 1B:
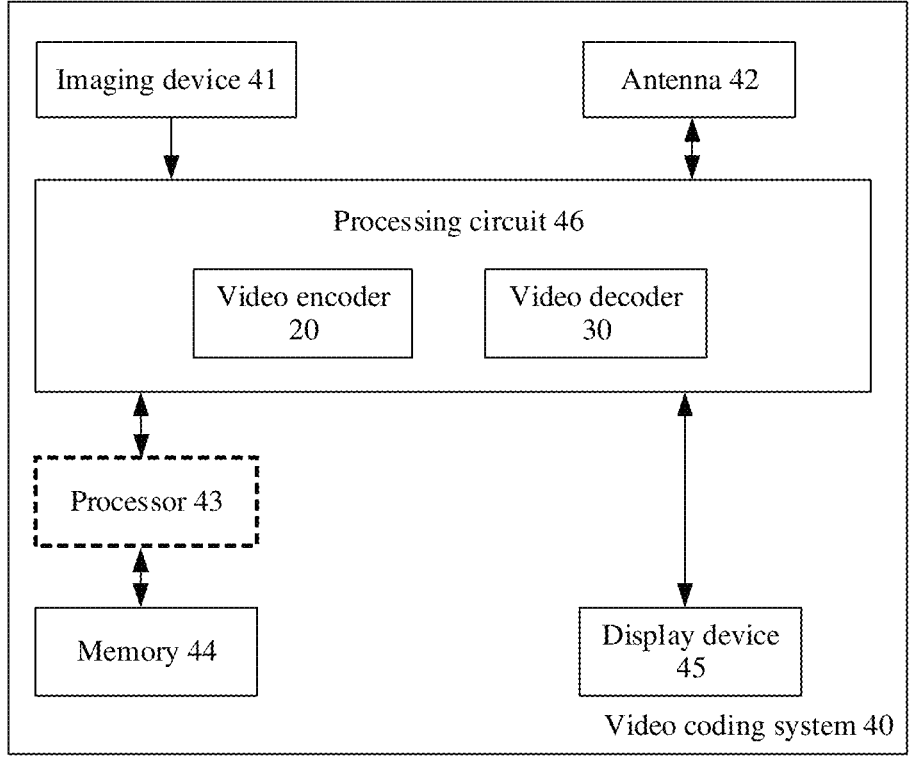
FIG. 1b is an example block diagram of a video coding system according to an embodiment of the present disclosure.
Figure 5:
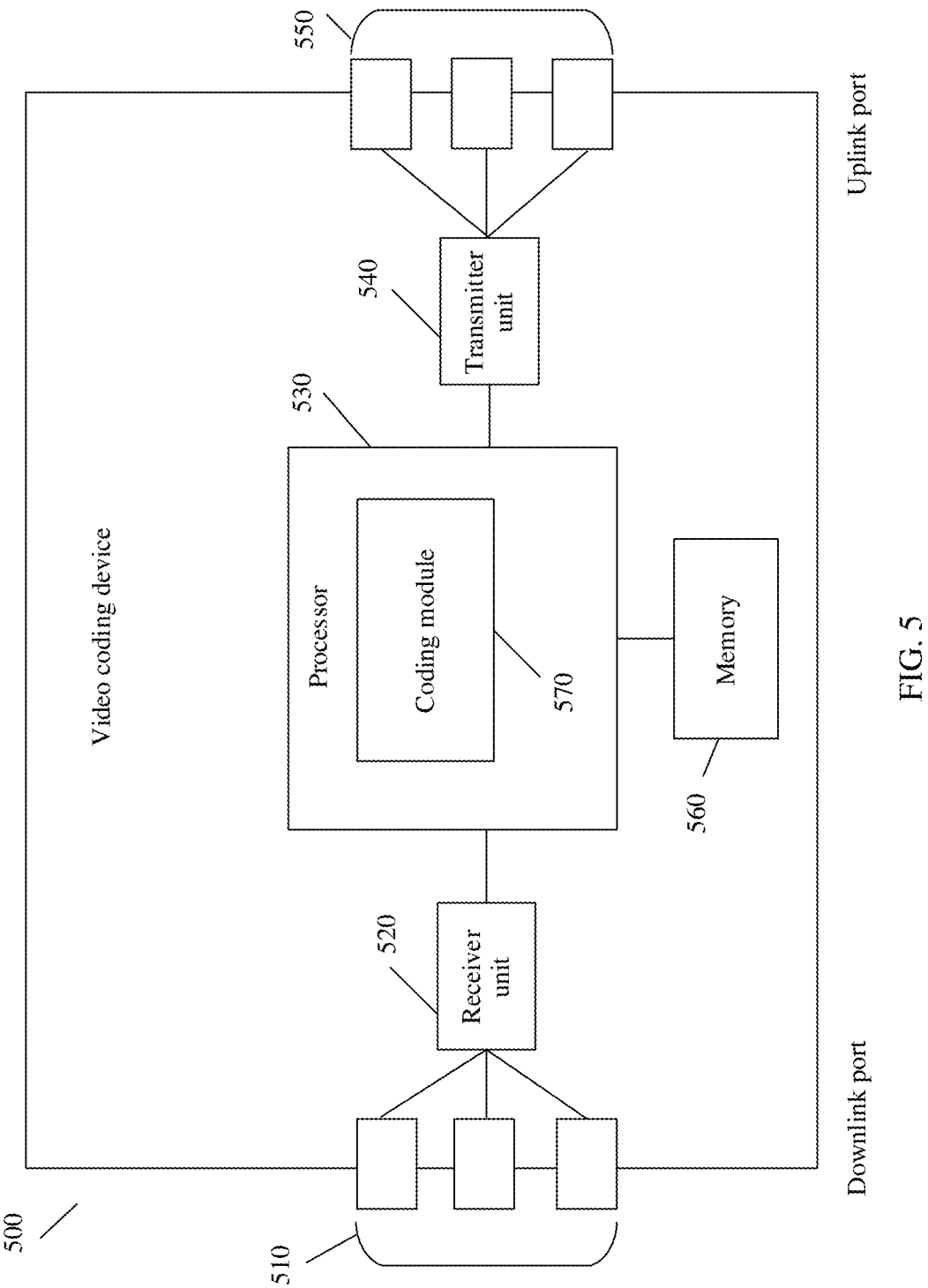
FIG. 5 is an example block diagram of a video coding device according to an embodiment of the present disclosure.

FIG. 1b is an example block diagram of a video coding system 40 according to an embodiment of the present disclosure. An encoder 20 (for example, a video encoder 20) or a decoder 30 (for example, a video decoder 30) or both may be implemented by using a processing circuit in the video coding system 40 shown in FIG. 1b, for example, one or more microprocessors, a digital signal processor (DSP), an application-specific integrated circuit (ASIC), a field-programmable gate array (FPGA), discrete logic, hardware, video encoding dedicated processor, or any combination thereof. FIG. 2 is an example block diagram of a video encoder according to an embodiment of the present disclosure, and FIG. 3 is an example block diagram of a video decoder according to an embodiment of the present disclosure. The encoder 20 may be implemented by using a processing circuit 46 to include various modules discussed with reference to the encoder 20 in FIG. 2 and/or any other encoder system or subsystem described in this specification. The decoder 30 may be implemented by using a processing circuit 46 to include various modules discussed with reference to the decoder 30 in FIG. 3 and/or any other decoder system or subsystem described in this specification. The processing circuit 46 may be configured to perform various operations as discussed later. As shown in FIG. 5, if some technologies are implemented in software, a device may store software instructions in an appropriate non-transitory computer-readable storage medium and may execute the instructions in hardware by using one or more processors to perform the technologies in embodiments of the present disclosure. Either of the video encoder 20 and the video decoder 30 may be integrated as a part of a combined encoder/decoder (CODEC) in a single device, as shown in FIG. 1b.

The source device 12 and the destination device 14 may include any one of various devices, including any type of handheld or stationary devices, for example, notebook or laptop computers, mobile phones, smartphones, tablets or tablet computers, cameras, desktop computers, set-top boxes, televisions, display devices, digital media players, video gaming consoles, video streaming devices (such as content service servers or content delivery servers), broadcast receiver devices, broadcast transmitter devices, or monitoring devices, and may not use or use any type of operating system. The source device 12 and the destination device 14 may alternatively be devices in a cloud computing scenario, for example, virtual machines in the cloud computing scenario. In some cases, the source device 12 and the destination device 14 may be equipped with components for wireless communication. Therefore, the source device 12 and the destination device 14 may be wireless communication devices.

Virtual scene applications (APPs) such as virtual reality (VR) applications, augmented reality (AR) applications, or mixed reality (MR) applications may be installed on the source device 12 and the destination device 14, and the VR applications, the AR applications, or the MR applications may be run based on a user operation (for example, tapping, touching, sliding, shaking, or voice control). The source device 12 and the destination device 14 may capture pictures/videos of any object in an environment via a camera and/or a sensor, and then display a virtual object on a display device based on the captured pictures/videos. The virtual object may be a virtual object (that is, an object in a virtual environment) in a VR scene, an AR scene, or an MR scene.

It should be noted that, in this embodiment, the virtual scene applications in the source device 12 and the destination device 14 may be built-in applications of the source device 12 and the destination device 14, or may be applications provided by a third-party service provider and installed by a user. This is not limited herein.

In addition, real-time video transmission applications, such as live broadcast applications, may be installed on the source device 12 and the destination device 14. The source device 12 and the destination device 14 may capture pictures/videos via the camera, and then display the captured pictures/videos on the display device.

In some cases, the video coding system 10 shown in FIG. 1a is merely an example and the technologies provided in embodiments of the present disclosure are applicable to video coding settings (for example, video encoding or video decoding). These settings do not necessarily include any data communication between an encoding device and a decoding device. In another example, data is retrieved from a local memory, and sent over a network. A video encoding device may encode data and store encoded data into the memory, and/or a video decoding device may retrieve data from the memory and decode the data. In some examples, encoding and decoding are performed by devices that do not communicate with each other, but simply encode data into a memory and/or retrieve data from the memory and decode the data.

FIG. 1b is the example block diagram of the video coding system 40 according to this embodiment. As shown in FIG. 1b, the video coding system 40 may include an imaging device 41, a video encoder 20, a video decoder 30 (and/or a video encoder/decoder implemented by using a processing circuit 46), an antenna 42, one or more processors 43, one or more memories 44, and/or a display device 45.

As shown in FIG. 1b, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processing unit, a general-purpose processor, or the like. In addition, the memory 44 may be a memory of any type, for example, a volatile memory (for example, a static random access memory (SRAM) or a dynamic random access memory (DRAM)) or a nonvolatile memory (for example, a flash memory). In a non-limitative example, the memory 44 may be implemented by a cache memory. In another example, the processing circuit 46 may include a memory (for example, a cache) configured to implement a picture buffer and the like.

In some examples, the video encoder 20 implemented by using a logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may be included in the video encoder 20 implemented by using the processing circuit 46 to implement various modules discussed with reference to FIG. 2 and/or any other encoder system or subsystem described in this specification. The logic circuit may be configured to perform various operations discussed in this specification.

In some examples, the video decoder 30 may be implemented by using the processing circuit 46 in a similar manner, to implement various modules discussed with reference to the video decoder 30 in FIG. 3 and/or any other decoder system or subsystem described in this specification. In some examples, the video decoder 30 implemented by using the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may be included in the video decoder 30 implemented by using the processing circuit 46 to implement various modules discussed with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

It should be understood that in this embodiment, for the example described with reference to the video encoder 20, the video decoder 30 may be configured to perform a reverse process. With regard to a signaling syntax element, the video decoder 30 may be configured to receive and parse the syntax element and accordingly decode related video data. In some examples, the video encoder 20 may entropy encode the syntax element into an encoded video bitstream. In such examples, the video decoder 30 may parse the syntax element and accordingly decode the related video data.

For ease of description, embodiments of the present disclosure are described with reference to versatile video coding (VVC) reference software or high-efficiency video coding (HEVC) developed by the joint collaboration team on video coding (JCT-VC) of the ITU-T video coding experts group (VCEG) and the ISO/IEC motion picture experts group (MPEG). Persons of ordinary skill in the art understand that embodiments of the present disclosure are not limited to the HEVC or the VVC.

Encoder and Encoding Method

Figure 2:
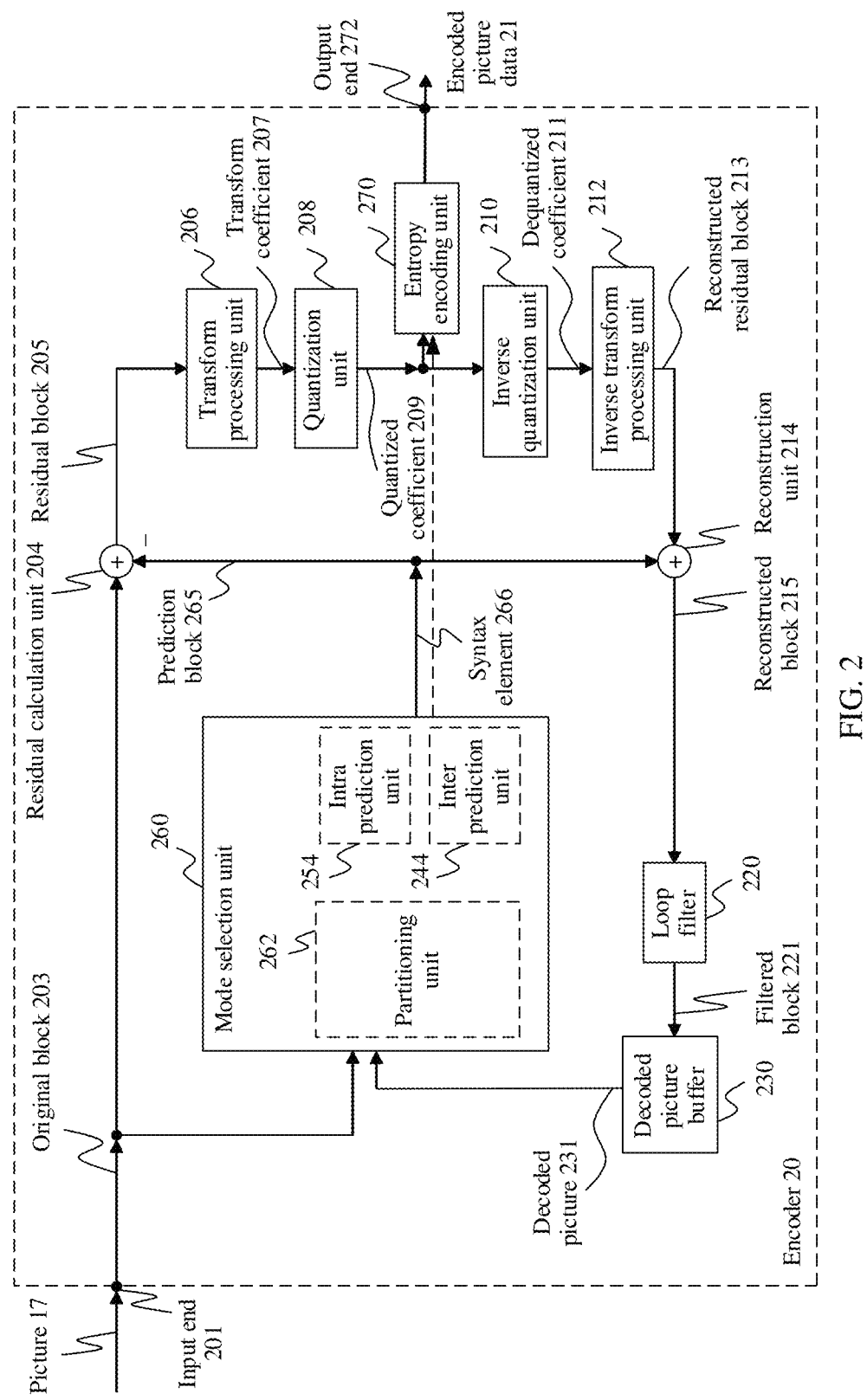
FIG. 2 is an example block diagram of a video encoder according to an embodiment of the present disclosure.

As shown in FIG. 2, the video encoder 20 includes an input end (or input interface) 201, a residual calculation unit 204, a transform processing unit 206, a quantization unit 208, an inverse quantization unit 210, and an inverse transform processing unit 212, a reconstruction unit 214, a loop filter 220, a decoded picture buffer (DPB) 230, a mode selection unit 260, an entropy encoding unit 270, and an output end (or an output interface) 272. The mode selection unit 260 may include an inter prediction unit 244, an intra prediction unit 254, and a partitioning unit 262. The inter prediction unit 244 may include a motion estimation unit and a motion compensation unit (not shown). The video encoder 20 shown in FIG. 2 may also be referred to as a hybrid video encoder or a video encoder based on a hybrid video codec.

Refer to FIG. 2. The inter prediction unit is a trained target model (also referred to as a neural network), and the neural network is used to process an input picture or picture region or picture block, to generate a predictor of the input picture block. For example, a neural network for inter prediction is configured to receive the input picture, picture area, or picture block, and generate the predictor of the input picture, picture area, or picture block.

The residual calculation unit 204, the transform processing unit 206, the quantization unit 208, and the mode selection unit 260 form a forward signal path of the encoder 20, whereas the inverse quantization unit 210, the inverse transform processing unit 212, the reconstruction unit 214, a buffer 216, the loop filter 220, the decoded picture buffer (DPB) 230, the inter prediction unit 244, and the intra prediction unit 254 form a backward signal path of the encoder. The backward signal path of the encoder 20 corresponds to the signal path of the decoder (refer to the decoder 30 in FIG. 3). The inverse quantization unit 210, the inverse transform processing unit 212, the reconstruction unit 214, the loop filter 220, the decoded picture buffer 230, the inter prediction unit 244, and the intra prediction unit 254 further form a "built-in decoder" of the video encoder 20.

Picture and Picture Partitioning (Picture and Block)

The encoder 20 may be configured to receive, via an input end 201, a picture (or picture data) 17, for example, a picture in a sequence of pictures forming a video or video sequence. The received picture or picture data may also be a preprocessed picture (or preprocessed picture data) 19. For ease of simplicity, the picture 17 is used in the following descriptions. The picture 17 may also be referred to as a current picture or a to-be-encoded picture (in particular, in video coding to distinguish the current picture from other pictures, for example, previously encoded and/or decoded pictures of a same video sequence, namely, a video sequence that also includes the current picture).

A (digital) picture is or may be considered as a two-dimensional array or matrix including samples with intensity values. A sample in the array may also be referred to as a pixel (pel) (short form of a picture element). Quantities of samples in horizontal and vertical directions (or axes) of the array or picture define a size and/or resolution of the picture. For representation of colors, three color components are usually used, that is, the picture may be represented as or include three sample arrays. In an RBG format or color space, a picture includes corresponding red, green, and blue sample arrays. However, in video coding, each pixel is usually represented in a luminance/chrominance format or color space, for example, YCbCr, which includes a luminance component indicated by Y (sometimes indicated by L) and two chrominance components indicated by Cb and Cr. The luminance (luma) component Y represents luminance or gray level intensity (for example, both are the same in a gray-scale picture), and the two chrominance (chroma for short) components Cb and Cr represent chrominance or color information components. Accordingly, a picture in a YCbCr format includes a luminance sample array of luminance sample values (Y), and two chrominance sample arrays of chrominance values (Cb and Cr). A picture in an RGB format may be converted or transformed into a picture in the YCbCr format and vice versa. The process is also referred to as color transform or conversion. If a picture is monochrome, the picture may include only a luminance sample array. Accordingly, a picture may be, for example, an array of luminance samples in a monochrome format or an array of luminance samples and two corresponding arrays of chrominance samples in 4:2:0, 4:2:2, and 4:4:4 color formats.

In an embodiment, an embodiment of the video encoder 20 may include a picture partitioning unit (not shown in FIG. 2) configured to partition the picture 17 into a plurality of (typically non-overlapping) picture blocks 203. These blocks may also be referred to as root blocks, macro blocks (H.264/AVC), coding tree blocks (CTBs), or coding tree units (CTUs) in the H.265/HEVC and VVC standards. The partitioning unit may be configured to use a same block size and a corresponding grid defining the block size for all pictures of a video sequence, or to change a block size between pictures or subsets or groups of pictures, and partition each picture into corresponding blocks.

In other embodiments, the video encoder may be configured to directly receive the block 203 of the picture 17, for example, one, several, or all blocks forming the picture 17. The picture block 203 may also be referred to as a current picture block or a to-be-encoded picture block.

Same as the picture 17, the picture block 203 is also or may be considered as a two-dimensional array or matrix including samples with intensity values (sample values), provided that the two-dimensional array or matrix of the picture block 203 is smaller than that of the picture 17. In other words, the block 203 may include one sample array (for example, a luminance array in a case of a monochrome picture 17, or a luminance or chrominance array in a case of a color picture), three sample arrays (for example, one luminance array and two chrominance arrays in a case of a color picture 17), or any other quantity and/or type of arrays depending on a used color format. Quantities of samples in horizontal and vertical directions (or axes) of the block 203 define the size of the block 203. Accordingly, a block may be an M×N (M columns×N rows) array of samples, or an M×N array of transform coefficients.

In an embodiment, the video encoder 20 shown in FIG. 2 may be configured to encode the picture 17 block by block, for example, encoding and prediction are performed on each block 203.

In an embodiment, the video encoder 20 shown in FIG. 2 may be further configured to partition and/or encode the picture by using slices (also referred to as video slices), where the picture may be partitioned or encoded by using one or more slices (typically non-overlapping). Each slice may include one or more blocks (for example, coding tree units CTUs) or one or more groups of blocks (for example, tiles in the H.265/IEVC/VVC standard and bricks (bricks) in the VVC standard).

In an embodiment, the video encoder 20 shown in FIG. 2 may be further configured to partition and/or encode the picture by using slices/tile groups (also referred to as video tile groups) and/or tiles (also referred to as video tiles). The picture may be partitioned or encoded by using one or more slices/tile groups (typically non-overlapping), and each slice/tile group may include one or more blocks (for example, CTUs) or one or more tiles. Each tile may be of a rectangular shape or another shape, and may include one or more complete or fractional blocks (for example, CTUs).

Residual Calculation

The residual calculation unit 204 may be configured to calculate a residual block 205 based on the picture block (an original block) 203 and a prediction block 265 (further details about the prediction block 265 are provided later), for example, by subtracting sample values of the prediction block 265 from sample values of the picture block 203 sample by sample (pixel by pixel), to obtain the residual block 205 in a pixel domain.

Transform

The transform processing unit 206 is configured to apply a transform, for example, a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in H.265/HEVC. Compared with an orthogonal DCT transform, such integer approximations are usually scaled by a factor. To preserve a norm of a residual block that is processed through forward transform and inverse transform, another scale factor is used as a part of a transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by the inverse transform processing unit 212 at the encoder 20 side (and a corresponding inverse transform by, for example, an inverse transform processing unit 312 at the decoder 30 side), and correspondingly, a corresponding scale factor may be specified for the forward transform by the transform processing unit 206 at the encoder 20 side.

In an embodiment, the video encoder 20 (correspondingly, the transform processing unit 206) may be configured to output transform parameters, for example, types of one or more transforms, for example, directly or after encoding or compressing performed by the entropy encoding unit 270, so that, for example, the video decoder 30 may receive and use the transform parameters for decoding.

Quantization

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for the scalar quantization, different proportions may be used to implement finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), or vice versa. The quantization may include division by a quantization step and corresponding and/or inverse dequantization, for example, by the inverse quantization unit 210, may include multiplication by the quantization step. Embodiments according to some standards such as the HEVC may be configured to use the quantization parameter to determine the quantization step. Generally, the quantization step may be calculated based on the quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, a scale of the inverse transform may be combined with a scale of the dequantization. Alternatively, customized quantization tables may be used and signaled from an encoder to a decoder, for example, in a bitstream. The quantization is a lossy operation, where a larger quantization step indicates a larger loss.

In an embodiment, the video encoder 20 (correspondingly, the quantization unit 208) may be configured to output a quantization parameter (QP), for example, directly or after encoding or compressing performed by the entropy encoding unit 270, so that, for example, the video decoder 30 may receive and use the quantization parameter for decoding.

Inverse Quantization

The inverse quantization unit 210 is configured to apply the inverse quantization of the quantization unit 208 on the quantized coefficients to obtain dequantized coefficients 211, for example, by applying an inverse scheme of the quantization scheme applied by the quantization unit 208 based on or using the same quantization step as the quantization unit 208. The dequantized coefficients 211 may also be referred to as dequantized residual coefficients 211 and corresponds to the transform coefficients 207. However, the dequantized coefficients 211 are typically not identical to the transform coefficients due to the loss caused by the quantization.

Inverse Transform

The inverse transform processing unit 212 is configured to apply the inverse transform of the transform applied by the transform processing unit 206, for example, an inverse discrete cosine transform (DCT) or an inverse discrete sine transform (DST), to obtain a reconstructed residual block 213 (or corresponding dequantized coefficients 213) in the pixel domain. The reconstructed residual block 213 may also be referred to as a transform block 213.

Reconstruction

The reconstruction unit 214 (for example, a summer 214) is configured to add the transform block 213 (that is, the reconstructed residual block 213) to the prediction block 265 to obtain a reconstructed block 215 in the pixel domain, for example, by adding sample values of the reconstructed residual block 213 and the sample values of the prediction block 265.

Filtering

The loop filter unit 220 (or "loop filter" 220 for short) is configured to filter the reconstructed block 215 to obtain a filtered block 221, or in general, to filter reconstructed samples to obtain filtered sample values. For example, the loop filter unit is configured to smooth pixel transitions or improve video quality. The loop filter unit 220 may include one or more loop filters such as a deblocking filter, a sample-adaptive offset (SAO) filter or one or more other filters, for example, an adaptive loop filter (ALF), a noise suppression filter (NSF), or any combination thereof. For example, the loop filter unit 220 may include a deblocking filter, a SAO filter, and an ALF filter. An order of a filtering process may be the deblocking filter, the SAO filter, and the ALF filter. For another example, a process called luminance mapping with chrominance scaling (LMCS) (namely, the adaptive in-loop reshaper) is added. This process is performed before deblocking. For another example, a deblocking filter process may also be applied to internal sub-block edges, for example, affine sub-block edges, ATMVP sub-block edges, sub-block transform (SBT) edges, and intra sub-partition (ISP) edges. Although the loop filter unit 220 is shown as the loop filter in FIG. 2, in another configuration, the loop filter unit 220 may be implemented as a post loop filter. The filtered block 221 may also be referred to as a filtered reconstructed block 221.

In an embodiment, the video encoder 20 (correspondingly, the loop filter unit 220) may be configured to output a loop filter parameter (such as a SAO filter parameter, an ALF filter parameter, or an LMCS parameter), for example, directly or after entropy encoding performed by the entropy encoding unit 270, so that, for example, the decoder 30 may receive and use a same loop filter parameter or different loop filter parameters for decoding.

Decoded Picture Buffer

The decoded picture buffer (DPB) 230 may be a reference picture memory that stores reference picture data for use in video data encoding by the video encoder 20. The DPB 230 may be formed by any one of a variety of memory devices, such as a dynamic random access memory (DRAM), including a synchronous DRAM (SDRAM), a magnetoresistive RAM (MRAM), a resistive RAM (RRAM), or another type of storage device. The decoded picture buffer 230 may be configured to store one or more filtered blocks 221. The decoded picture buffer 230 may be further configured to store other previously filtered blocks, for example, previously reconstructed and filtered blocks 221, of a same current picture or different pictures such as previously reconstructed pictures, and may provide complete previously reconstructed, for example, decoded pictures (and corresponding reference blocks and samples) and/or a partially reconstructed current picture (and a corresponding reference block and sample), for example, for inter prediction. The decoded picture buffer 230 may be further configured to store one or more unfiltered reconstructed blocks 215, or generally store unfiltered reconstructed samples, for example, the reconstructed block 215 that is not filtered by the loop filter unit 220, or a reconstructed block or a reconstructed sample on which no any other processing is performed.

Mode Selection (Partitioning and Prediction)

The mode selection unit 260 includes the partitioning unit 262, the inter prediction unit 244, and the intra prediction unit 254, and is configured to receive or obtain raw picture data, for example, the original block 203 (the current block 203 of the current picture 17), and reconstructed picture data, for example, filtered and/or unfiltered reconstructed samples or blocks of the same (current) picture and/or from one or a plurality of previously decoded pictures, from the decoded picture buffer 230 or other buffers (for example, a line buffer, not shown in FIG. 2). The reconstructed picture data is used as reference picture data for prediction, for example, inter prediction or intra prediction, to obtain the prediction block 265 or predictor 265.

The mode selection unit 260 may be configured to determine or select partitioning for a current block (including non-partitioning) and a prediction mode (for example, an intra or inter prediction mode) and generate a corresponding prediction block 265, which is used for calculation of the residual block 205 and for the reconstruction of the reconstructed block 215.

In an embodiment, the mode selection unit 260 may be configured to select partitioning and prediction modes (for example, from prediction modes supported by or available to the mode selection unit 260). The prediction mode provides best matching or a minimum residual (the minimum residual means better compression for transmission or storage), provides minimum signaling overheads (the minimum signaling overheads mean better compression for transmission or storage), or considers or balances both the minimum residual and the minimum signaling overheads. The mode selection unit 260 may be configured to determine the partitioning and the prediction mode based on bit rate distortion optimization (RDO), that is, select a prediction mode that provides minimum bit rate distortion optimization. The terms "best", "lowest", "optimal" and the like in this specification do not necessarily mean "best", "lowest", "optimal" in general, but may also mean situations in which termination or selection criteria are met. For example, values that exceed or fall below a threshold or other restrictions may result in a "suboptimal selection" but reduce complexity and processing time.

In other words, the partitioning unit 262 may be configured to partition a picture from a video sequence into a sequence of coding tree units (CTUs), and the CTU 203 may be further partitioned into smaller block partitions or sub-blocks (which form the blocks again), for example, iteratively using quad-tree partitioning (QT), binary-tree partitioning (BT) or triple-tree partitioning (TT) or any combination thereof, and to perform, for example, prediction for each of the block partitions or sub-blocks, where the mode selection includes selection of a tree structure of the partitioned block 203 and prediction modes applied to each of the block partitions or sub-blocks.

The following describes partitioning (for example, by the partitioning unit 262) and prediction processing (for example, by the inter prediction unit 244 and the intra prediction unit 254) performed by the video encoder 20 in detail.

Partitioning

The partitioning unit 262 may partition (or split) a picture block (or a CTU) 203 into smaller partitions, for example, square or rectangular smaller blocks. For a picture that has three sample arrays, one CTU includes a block of N×N luminance samples and two corresponding blocks of chrominance samples. A maximum allowed size of the luminance block in the CTU is specified to be 128×128 in a developing versatile video coding (VVC) standard, but may be specified to be a value different from 128×128 in the future, for example, 256×256. CTUs of a picture may be clustered/grouped as slices/tile groups, tiles, or bricks. One tile covers a rectangular area of one picture, and one tile may be divided into one or more bricks. A brick includes a plurality of CTU rows in a tile. A tile that is not partitioned into a plurality of bricks can be referred to as a brick. However, a brick is a true subset of a tile and is not referred to as a tile. The following two modes of tile groups are supported in VVC: a raster-scan slice/tile group mode and a rectangular slice mode. In the raster-scan tile group mode, one slice/tile group includes a sequence of tiles in tile raster scan of one picture. In the rectangular slice mode, a slice includes a plurality of bricks of a picture that collectively form a rectangular area of the picture. The bricks in the rectangular slice are arranged in a brick raster scan order of the slice. These smaller blocks (which may also be referred to as sub-blocks) may be further partitioned into even smaller partitions. This is also referred to as tree partitioning or hierarchical tree partitioning. A root block, for example, at a root tree level 0 (a hierarchy level 0 and a depth 0) may be recursively partitioned into two or more blocks at a next lower tree level, for example, nodes at a tree level 1 (a hierarchy level 1 and a depth 1). These blocks may be further partitioned into two or more blocks at a next lower level, for example, a tree level 2 (a hierarchy level 2 and a depth 2), and the like, until the partitioning is terminated (because a termination criterion is met, for example, a maximum tree depth or a minimum block size is reached). Blocks that are not further partitioned are also referred to as leaf blocks or leaf nodes of a tree. A tree using partitioning into two partitions is referred to as a binary tree (BT), a tree using partitioning into three partitions is referred to as a ternary tree (TT), and a tree using partitioning into four partitions is referred to as a quadtree (QT).

For example, a coding tree unit (CTU) may be or include a CTB of luminance samples, two corresponding CTBs of chrominance samples of a picture that has three sample arrays, or a CTB of samples of a monochrome picture or a picture that is coded using three separate color planes and syntax structures (used to code the samples). Correspondingly, a coding tree block (CTB) may be an N×N block of samples for some value of N such that the division of a component into CTBs is a partitioning. A coding unit (CU) may be or include a coding block of luminance samples, two corresponding coding blocks of chrominance samples of a picture that has three sample arrays, or a coding block of samples of a monochrome picture or a picture that is coded using three separate color planes and syntax structures (used to code the samples). Correspondingly, a coding block (CB) may be an M×N block of samples for some values of M and N such that the division of a CTB into coding blocks is a partitioning.

In embodiments, for example, according to HEVC, a coding tree unit (CTU) may be split into a plurality of CUs by using a quadtree structure denoted as a coding tree. Whether to code a picture area using inter (temporal) or intra (spatial) prediction is determined at a leaf CU level. Each leaf CU can be further split into one, two, or four PUs based on a PU splitting type. A same prediction process is used in one PU, and related information is transmitted to the decoder on a PU basis. After a residual block is obtained through the prediction process based on the PU splitting type, a leaf CU may be partitioned into transform units (TUs) based on another quadtree structure similar to the coding tree for the CU.

For example, in an embodiment, according to a developing latest video coding standard (referred to as versatile video coding (VVC)), a combined quadtree with a nested multi-type tree (such as a binary tree and a ternary tree) is used to split a segmentation structure for partitioning a coding tree unit. In a coding tree structure in a coding tree unit, a CU may be square or rectangular. For example, the coding tree unit (CTU) is first partitioned using a quadtree structure. Then leaf nodes of the quadtree are further partitioned using a multi-type tree structure. There are four splitting types in the multi-type tree structure: vertical binary tree splitting (SPLIT_BT_VER), horizontal binary tree splitting (SPLIT_BT_HOR), vertical ternary tree splitting (SPLIT_TT_VER), and horizontal ternary tree splitting (SPLIT_TT_HOR). Leaf nodes of the multi-type tree are referred to as coding units (CUs). Such segmentation is used for prediction and transform processing without any other partitioning, unless the CU is excessively large for a maximum transform length. This means that, in most cases, the CU, the PU, and the TU have a same block size in the coding block structure of the quadtree with the nested multi-type tree. An exception occurs when the maximum supported transform length is less than a width or a height of a color component of the CU. A unique signaling mechanism of partitioning or splitting information in the coding structure of the quadtree with the nested multi-type tree is formulated in VVC. In the signaling mechanism, a coding tree unit (CTU) is treated as a root of a quadtree and is first partitioned using a quadtree structure. Each leaf node of the quadtree (when being fully large) is then further partitioned using a multi-type tree structure. In the multi-type tree structure, a first flag (mtt_split_cu_flag) indicates whether the node is further partitioned; when the node is further partitioned, a second flag (mtt_split_cu_vertical_flag) indicates a splitting direction; and then a third flag (mtt_split_cu_binary_flag) indicates whether the splitting is binary tree splitting or ternary tree splitting. A multi-type tree splitting mode (MttSplitMode) of a CU can be derived by a decoder based on a predefined rule or a table and values of mtt_split_cu_vertical_flag and mtt_split_cu_binary_flag. It should be noted that, for a specific design, for example, a 64×64 luminance block and 32×32 chrominance pipeline design in VVC hardware decoders, TT splitting is not allowed when either a width or a height of a luminance coding block is greater than 64. TT splitting is also not allowed when either a width or a height of a chrominance coding block is larger than 32. In the pipeline design, a picture is split into a plurality of virtual pipeline data units (VPDUs), and the VPDUs are defined as non-overlapping units in the picture. In hardware decoders, consecutive VPDUs are processed in a plurality of pipeline stages simultaneously. A VPDU size is roughly proportional to a buffer size in most pipeline stages. Therefore, a small VPDU size needs to be kept. In most hardware decoders, the VPDU size can be set to a maximum transform block (TB) size. However, in VVC, ternary tree (TT) and binary tree (BT) partitioning may cause an increase in the VPDU size.

In addition, it should be noted that, when a portion of a tree node block exceeds a bottom or a right picture boundary, the tree node block is forced to be split until the all samples of every coded CU are located inside the picture boundaries.

For example, an intra sub-partition (ISP) tool may split a luminance intra prediction block vertically or horizontally into two or four sub-partitions based on a block size.

In an example, the mode selection unit 260 of the video encoder 20 may be configured to perform any combination of the partitioning techniques described above.

As described above, the video encoder 20 is configured to determine or select the best or an optimal prediction mode from a (pre-determined) prediction mode set. The prediction mode set may include, for example, an intra prediction mode and/or an inter prediction mode.

Intra Prediction

An intra prediction mode set may include 35 different intra prediction modes, for example, non-directional modes such as a DC (or average value) mode and a planar mode, or directional modes such as those defined in HEVC, or may include 67 different intra prediction modes, for example, non-directional modes such as a DC (or average value) mode and a planar mode, or directional modes such as those defined in VVC. For example, several conventional angular intra prediction modes are adaptively replaced with wide-angle intra prediction modes for non-square blocks as defined in VVC. For another example, to avoid division operations for DC prediction, only a longer side is used to compute an average value for non-square blocks. In addition, results of intra prediction of the planar mode may be further modified using a position dependent intra prediction combination (PDPC) method.

The intra prediction unit 254 is configured to use reconstructed samples of neighboring blocks of the same current picture to generate an intra prediction block 265 according to an intra prediction mode in the intra prediction mode set.

The intra prediction unit 254 (or usually the mode selection unit 260) is further configured to output intra prediction parameters (or usually information indicating the selected intra prediction mode for the block) to the entropy encoding unit 270 in a form of syntax elements 266 for inclusion into the encoded picture data 21, so that, for example, the video decoder 30 may receive and use the prediction parameters for decoding.

Intra prediction modes in HEVC include a direct current prediction mode, a planar prediction mode, and 33 angular prediction modes, that is, there are 35 candidate prediction modes in total. Pixels of reconstructed picture blocks on left and upper sides as references for intra prediction on a current block. A picture block that is in a surrounding area of the current block and that is used to perform intra prediction on the current block becomes a reference block, and a pixel in the reference block is referred to as a reference pixel. In the 35 candidate prediction modes, the direct current prediction mode is applicable to an area whose texture is flat in the current block, and an average value of reference pixels in the reference block is used as prediction for all pixels in the area. The planar prediction mode is applicable to a picture block whose texture changes smoothly. For the current block that meets the condition, bilinear interpolation is performed by using a reference pixel in a reference block as prediction of all pixels in the current block. In the angular prediction mode, a value of a reference pixel in a corresponding reference block is copied along an angle as prediction of all pixels in the current block by using a feature that texture of the current block is highly correlated with texture of a neighboring reconstructed picture block.

An HEVC encoder selects an optimal intra prediction mode from the 35 candidate prediction modes for the current block, and writes the optimal intra prediction mode into a video bitstream. To improve coding efficiency of intra prediction, the encoder/decoder derives three most probable modes from respective optimal intra prediction modes of reconstructed picture blocks that use intra prediction in the surrounding area. If the optimal intra prediction mode selected for the current block is one of the three most probable modes, a first index is encoded to indicate that the selected optimal intra prediction mode is one of the three most probable modes. If the selected optimal intra prediction mode is not one of the three most probable modes, a second index is encoded to indicate that the selected optimal intra prediction mode is one of the other 32 modes (modes other than the foregoing three most probable modes in the 35 candidate prediction modes). In the HEVC standard, a 5-bit fixed-length code is used as the foregoing second index.

A method for deriving the three most probable modes by the HEVC encoder includes: selecting optimal intra prediction modes of the left neighboring picture block and the upper neighboring picture block of the current block, and putting the optimal intra prediction modes into a set; and if the two optimal intra prediction modes are the same, retaining only one intra prediction mode in the set. If the two optimal intra prediction modes are the same and both are angular prediction modes, two angular prediction modes adjacent to an angle direction are further selected and added to the set. Otherwise, the planar prediction mode, the direct current mode, and a vertical prediction mode are sequentially selected and added to the set until a quantity of modes in the set reaches 3.

After performing entropy decoding on the bitstream, the HEVC decoder obtains mode information of the current block. The mode information includes an identifier indicating whether the optimal intra prediction mode of the current block is in the three most probable modes, an index of the optimal intra prediction mode of the current block in the three most probable modes, or an index of the optimal intra prediction mode of the current block in the other 32 modes.

Inter Prediction

In a possible implementation, an inter prediction mode set depends on available reference pictures (that is, for example, at least some of previously decoded pictures stored in the DBP 230) and other inter prediction parameters, for example, depends on whether the entire reference picture or only a part, for example, a search window area near the area of the current block, of the reference picture is used for searching for a best matching reference block, and/or for example, depends on whether pixel interpolation is applied, for example, half-pixel, quarter-pixel and/or $\frac{1}{16}$-pixel interpolation, or not.

In addition to the foregoing prediction modes, a skip mode and/or a direct mode may further be applied.

For example, a merge candidate list of an extended merge prediction mode includes the following five classes of candidates in order: spatial MVP from spatial neighboring CUs, temporal MVP from collocated CUs, history-based MVP from an FIFO table, pairwise average MVP, and zero MVs. Bilateral matching-based decoder side motion vector refinement (DMVR) may be used to increase accuracy of the MVs of the merge mode. A merge mode with MVD (MMVD) comes from a merge mode with motion vector differences. An MMVD flag is sent immediately after a skip flag and a merge flag are sent, to specify whether the MMVD mode is used for a CU. A CU-level adaptive motion vector resolution (AMVR) scheme may be used. An AMVR supports MVD of the CU to be coded in different precision. An MVD of a current CU may be adaptively selected based on a prediction mode of the current CU. When a CU is coded in the merge mode, a combined inter/intra prediction (CIIP) mode may be applied to the current CU. Weighted averaging of inter and intra prediction signals is performed to obtain CIIP prediction. For affine motion compensation prediction, an affine motion field of a block is described by using motion information of two control point (4-parameter) motion vectors or three control point (6-parameter) motion vectors. Sub-block-based temporal motion vector prediction (SbTMVP) is similar to temporal motion vector prediction (TMVP) in HEVC, but predicts a motion vector of a sub-CU in the current CU. A bi-directional optical flow (BDOF), previously referred to as BIO, is a simpler version that requires much less computation, especially in terms of a quantity of multiplications and a value of a multiplier. In a triangle partitioning mode, a CU is split evenly into two triangular partitions through diagonal splitting and anti-diagonal splitting. In addition, a bi-prediction mode is extended beyond simple averaging to support weighted averaging of two prediction signals.

The inter prediction unit 244 may include a motion estimation (ME) unit and a motion compensation (MC) unit (which are not shown in FIG. 2). The motion estimation unit may be configured to receive or obtain the picture block 203 (the current picture block 203 of the current picture 17) and a decoded picture 231, or at least one or more previously reconstructed blocks, for example, reconstructed blocks of one or more other/different previously decoded pictures 231, for motion estimation. For example, a video sequence may include the current picture and the previously decoded picture 231, or in other words, the current picture and the previously decoded picture 231 may be a part of or form a sequence of pictures forming the video sequence.

For example, the encoder 20 may be configured to select a reference block from a plurality of reference blocks of a same picture or different pictures of a plurality of other pictures and provide a reference picture (or a reference picture index) and/or an offset (spatial offset) between a position (x and y coordinates) of the reference block and a position of the current block as inter prediction parameters to the motion estimation unit. This offset is also referred to as a motion vector (MV).

The motion compensation unit is configured to obtain, for example, receive, an inter prediction parameter and to perform inter prediction based on or using the inter prediction parameter to obtain an inter prediction block 246. Motion compensation, performed by the motion compensation unit, may involve fetching or generating the prediction block based on the motion/block vector determined by motion estimation, and may further involve performing interpolations to sub-pixel precision. Interpolation filtering may be performed to generate a sample of another pixel from a sample of a known pixel, to potentially increase a quantity of candidate prediction blocks that may be used to encode a picture block. Upon receiving the motion vector for the PU of the current picture block, the motion compensation unit may locate the prediction block to which the motion vector points in one of the reference picture lists.

The motion compensation unit may further generate syntax elements associated with a block and a video slice for use by the video decoder 30 in decoding the picture blocks of the video slice. In addition or as an alternative to slices and corresponding syntax elements, tile groups and/or tiles and corresponding syntax elements may be generated or used.

Figure 4:
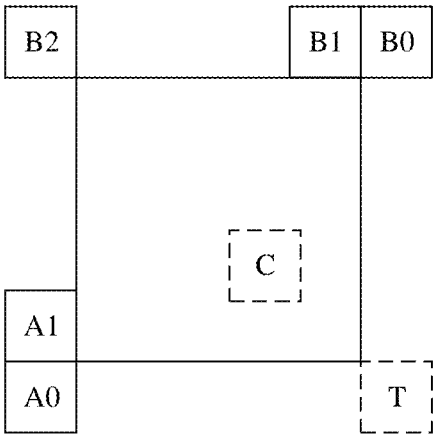
FIG. 4 is an example diagram of candidate picture blocks according to an embodiment of the present disclosure.

In a process of obtaining a candidate motion vector list in an advanced motion vector prediction (AMVP) mode, a motion vector (MV) that may be added to the candidate motion vector list as an alternative includes MVs of spatially neighboring and temporally neighboring picture blocks of the current block. The MV of the spatially neighboring picture block may include an MV of a left candidate picture block of the current block and an MV of an upper candidate picture block of the current block. For example, FIG. 4 is an example diagram of candidate picture blocks according to an embodiment of the present disclosure. As shown in FIG. 4, a set of left candidate picture blocks includes {A0, A1}, a set of upper candidate picture blocks includes {B0, B1, B2}, and a set of temporally neighboring candidate picture blocks includes {C, T}. All the three sets may be added to the candidate motion vector list as alternatives. However, according to an existing coding standard, a maximum length of the candidate motion vector list for AMVP is 2. Therefore, it is necessary to determine to add MVs of a maximum of two picture blocks to the candidate motion vector list from the three sets in a specified order. The order may be as follows. The set of left candidate picture blocks {A0, A1} of the current block is preferentially considered (where A0 is first considered, and A1 is then considered if A0 is unavailable); then the set of upper candidate picture blocks {B0, B1, B2} of the current block is considered (where B0 is first considered, B1 is then considered if B0 is unavailable, and B2 is then considered if B1 is unavailable); and finally, the set of temporally neighboring candidate picture blocks {C, T} of the current block is considered (where T is first considered, and C is then considered if T is unavailable).

After the candidate motion vector list is obtained, an optimal MV is determined from the candidate motion vector list based on a rate distortion cost (RD cost), and a candidate motion vector with a minimum RD cost is used as a motion vector predictor (MVP) of the current block. The rate distortion cost is calculated according to the following formula:

$$J = SAD + \lambda R$$

J represents the RD cost, SAD is a sum of absolute differences (SAD), obtained through motion estimation based on the candidate motion vector, between a pixel value of a prediction block and a pixel value of the current block, R represents a bit rate, and $\lambda$ represents a Lagrange multiplier.

The encoder side transfers an index of the determined MVP in the candidate motion vector list to the decoder side. Further, motion search may be performed in an MVP-centered neighboring domain, to obtain an actual motion vector of the current block. The encoder side calculates a motion vector difference (MVD) between the MVP and the actual motion vector, and transfers the MVD to the decoder side. The decoder side parses an index, finds a corresponding MVP in the candidate motion vector list based on the index, parses the MVD, and adds the MVD and the MVP to obtain the actual motion vector of the current block.

In a process of obtaining a candidate motion information list in a merge mode, motion information that can be added to the candidate motion information list as an alternative includes motion information of the spatially neighboring picture block or temporally neighboring picture block of the current block. The spatially neighboring picture block and the temporally neighboring picture block may be shown in FIG. 4. Candidate motion information corresponding to spatial domain in the candidate motion information list comes from five spatially neighboring blocks (A0, A1, B0, B1, and B2). If the spatially neighboring block is unavailable or is in an intra prediction mode, motion information of the spatially neighboring block is not added to the candidate motion information list. Temporal candidate motion information of the current block is obtained by scaling an MV of a block at a corresponding position in a reference frame based on a picture order count (POC) of the reference frame and a picture order count of a current frame. Whether a block at a position T in the reference frame is available is first determined. If not available, a block at a position C is selected. After the candidate motion information list is obtained, optimal motion information is determined as motion information of the current block from the candidate motion information list based on the RD cost. The encoder side transmits an index value (denoted as a merge index) of a position of the optimal motion information in the candidate motion information list to the decoder side.

Entropy Encoding

The entropy encoding unit 270 is configured to apply an entropy encoding algorithm or scheme (for example, a variable length coding (VLC) scheme, a context-adaptive VLC (CAVLC) scheme, an arithmetic coding scheme, a binarization algorithm, a context-adaptive binary arithmetic coding (CABAC), syntax-based context-adaptive binary arithmetic coding (SBAC), probability interval partitioning entropy (PIPE) coding or another entropy encoding method or technology) to the quantized residual coefficients 209, inter prediction parameters, intra prediction parameters, loop filter parameters and/or other syntax elements to obtain encoded picture data 21 that can be output via an output end 272, for example, in a form of an encoded bitstream 21, so that the video decoder 30 and the like can receive and use the parameters for decoding. The encoded bitstream 21 may be transmitted to the video decoder 30, or stored in a memory for later transmission or retrieval by the video decoder 30.

Another structural variation of the video encoder 20 may be used to encode the video stream. For example, a non-transform-based encoder 20 may quantize a residual signal directly without the transform processing unit 206 for some blocks or frames. In another implementation, the encoder 20 may have the quantization unit 208 and the inverse quantization unit 210 combined into a single unit.

Decoder and Decoding Method

As shown in FIG. 3, the video decoder 30 is configured to receive encoded picture data 21 (for example, the encoded bitstream 21), for example, encoded by the encoder 20, to obtain a decoded picture 331. The encoded picture data or bitstream includes information for decoding the encoded picture data, for example, data that represents picture blocks of an encoded video slice (and/or tile groups or tiles), and associated syntax elements.

In the example of FIG. 3, the decoder 30 includes an entropy decoding unit 304, an inverse quantization unit 310, an inverse transform processing unit 312, a reconstruction unit 314 (for example, a summer 314), a loop filter 320, a decoded picture buffer 330, a mode application unit 360, an inter prediction unit 344, and an intra prediction unit 354. The inter prediction unit 344 may be or include a motion compensation unit. In some examples, the video decoder 30 may perform a decoding process generally reciprocal to the encoding process described with reference to the video encoder 100 shown in FIG. 2.

As explained with regard to the encoder 20, the inverse quantization unit 210, the inverse transform processing unit 212, the reconstruction unit 214, the loop filter 220, the decoded picture buffer DPB 230, the inter prediction unit 344, and the intra prediction unit 354 further form a "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to the reconstruction unit 214, the loop filter 320 may be identical in function to the loop filter 220, and the decoded picture buffer 330 may be identical in function to the decoded picture buffer 230. Therefore, the explanations provided for corresponding units and functions of the video encoder 20 are correspondingly applicable to corresponding units and functions of the video decoder 30.

Entropy Decoding

The entropy decoding unit 304 is configured to parse the bitstream 21 (or usually the encoded picture data 21) and perform entropy decoding on the encoded picture data 21 to obtain quantized coefficients 309 and/or decoded coding parameters (not shown in FIG. 3), for example, any or all of inter prediction parameters (for example, a reference picture index and a motion vector), intra prediction parameters (for example, an intra prediction mode or an index), transform parameters, quantization parameters, loop filter parameters, and/or other syntax elements. The entropy decoding unit 304 may be configured to apply the decoding algorithm or scheme corresponding to the encoding scheme as described with regard to the entropy encoding unit 270 of the encoder 20. The entropy decoding unit 304 may be further configured to provide the inter prediction parameter, the intra prediction parameter, and/or another syntax element to the mode application unit 360, and provide another parameter to another unit of the decoder 30. The video decoder 30 may receive syntax elements at a video slice level and/or a video block level. In addition or as an alternative to slices and corresponding syntax elements, tile groups and/or tiles and corresponding syntax elements may be received or used.

Inverse Quantization

The inverse quantization unit 310 may be configured to receive quantization parameters (QPs) (or usually the information related to the inverse quantization) and quantized coefficients from the encoded picture data 21 (for example, by parsing and/or decoding by the entropy decoding unit 304) and perform, based on the quantization parameters, an inverse quantization on the decoded quantized coefficients 309 to obtain dequantized coefficients 311. The dequantized coefficients 311 may also be referred to as transform coefficients 311. An inverse quantization process may include use of a quantization parameter calculated by the video encoder 20 for each video block in the video slice to determine a degree of quantization, and likewise, a degree of inverse quantization that needs to be performed.

Inverse Transform

The inverse transform processing unit 312 may be configured to receive dequantized coefficients 311, also referred to as transform coefficients 311, and apply a transform to the dequantized coefficients 311 to obtain reconstructed residual blocks 213 in a pixel domain. The reconstructed residual block 213 may also be referred to as a transform block 313. The transform may be an inverse transform, for example, an inverse DCT, an inverse DST, an inverse integer transform, or a conceptually similar inverse transform process. The inverse transform processing unit 312 may be further configured to receive transform parameters or corresponding information from the encoded picture data 21 (for example, by parsing and/or decoding by the entropy decoding unit 304) to determine the transform to be applied to the dequantized coefficients 311.

Reconstruction

The reconstruction unit 314 (for example, the summer 314) is configured to add the reconstructed residual block 313 to the prediction block 365 to obtain a reconstructed block 315 in the pixel domain, for example, by adding the sample values of the reconstructed residual block 313 and the sample values of the prediction block 365.

Filtering

The loop filter unit 320 (either in a coding loop or after the coding loop) is configured to filter the reconstructed block 315 to obtain a filtered block 321, to smooth pixel transitions or improve video quality. The loop filter unit 320 may include one or more loop filters such as a deblocking filter, a sample-adaptive offset (SAO) filter or one or more other filters, for example, an adaptive loop filter (ALF), a noise suppression filter (NSF), or any combination thereof. For example, the loop filter unit 220 may include a deblocking filter, a SAO filter, and an ALF filter. An order of a filtering process may be the deblocking filter, the SAO filter, and the ALF filter. For another example, a process called luminance mapping with chrominance scaling (LMCS) (namely, the adaptive in-loop reshaper) is added. This process is performed before deblocking. For another example, a deblocking filter process may also be applied to internal sub-block edges, for example, affine sub-block edges, ATMVP sub-block edges, sub-block transform (SBT) edges, and intra sub-partition (ISP) edges. Although the loop filter unit 320 is shown as the loop filter in FIG. 3, in another configuration, the loop filter unit 320 may be implemented as a post loop filter.

Decoded Picture Buffer

Decoded video blocks 321 of a picture are then stored in the decoded picture buffer 330, and the decoded picture buffer 330 stores the decoded pictures 331 as reference pictures for subsequent motion compensation for other pictures and/or for separate output display.

The decoder 30 is configured to output the decoded picture 311, for example, via an output end 331, for presentation to a user or viewing by a user.

Prediction

The inter prediction unit 344 may be identical in function to the inter prediction unit 244 (in particular to the motion compensation unit), and the intra prediction unit 354 may be identical in function to the intra prediction unit 254, and performs splitting or partitioning determining and prediction based on the partitioning and/or prediction parameters or respective information received from the encoded picture data 21 (for example, by parsing and/or decoding by the entropy decoding unit 304). The mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, the intra prediction unit 354 of the mode application unit 360 is configured to generate the prediction block 365 for a picture block of the current video slice based on a signaled intra prediction mode and data from previously decoded blocks of the current picture. When the video picture is coded as an inter coded (that is, B or P) slice, the inter prediction unit 344 (for example, the motion compensation unit) of the mode application unit 360 is configured to generate the prediction block 365 for a video block of the current video slice based on the motion vectors and other syntax elements received from the entropy decoding unit 304. For inter prediction, the prediction blocks may be generated from a reference picture in a reference picture list. The video decoder 30 may construct reference frame lists: a list 0 and a list 1, by using a default construction technology based on reference pictures stored in the DPB 330. The same or similar process may be applied for or by embodiments using tile groups (for example, video tile groups) and/or tiles (for example, video tiles) in addition or alternatively to slices (for example, video slices), for example, a video may be coded by using I, P or B tile groups and/or tiles.

The mode application unit 360 is configured to determine the prediction information for a video block of the current video slice by parsing the motion vectors or other syntax elements, and use the prediction information to generate the prediction block for the current video block being decoded. For example, the mode application unit 360 uses some of the received syntax elements to determine a prediction mode (for example, intra prediction or inter prediction) used to code the video blocks of the video slice, an inter prediction slice type (for example, a B slice, a P slice, or a GPB slice), construction information for one or more of the reference picture lists for the slice, motion vectors for each inter coded video block of the slice, an inter prediction status for each inter coded video block of the slice, and other information to decode the video blocks in the current video slice. The same or similar process may be applied for or by embodiments using tile groups (for example, video tile groups) and/or tiles (for example, video tiles) in addition or alternatively to slices (for example, video slices), for example, a video may be coded by using I, P or B tile groups and/or tiles.

In an embodiment, the video decoder 30 in FIG. 3 may be further configured to partition and/or decode a picture by using slices (also referred to as video slices), where the picture may be partitioned or decoded by using one or more slices (typically non-overlapping). Each slice may include one or more blocks (for example, CTUs) or one or more groups of blocks (for example, tiles in the H.265/HEVC/VVC standard and bricks in the VVC standard).

In an embodiment, the video decoder 30 shown in FIG. 3 may be further configured to partition and/or decode the picture by using slices/tile groups (also referred to as video tile groups) and/or tiles (also referred to as video tiles). The picture may be partitioned or decoded by using one or more slices/tile groups (typically non-overlapping), and each slice/tile group may include one or more blocks (for example, CTUs) or one or more tiles. Each tile may be of a rectangular shape or another shape, and may include one or more complete or fractional blocks (for example, CTUs).

Other variations of the video decoder 30 may be used to decode the encoded picture data 21. For example, the decoder 30 may generate an output video stream without the loop filter unit 320. For example, a non-transform-based decoder 30 may inversely quantize the residual signal directly without the inverse transform processing unit 312 for some blocks or frames. In another implementation, the video decoder 30 may have the inverse quantization unit 310 and the inverse transform processing unit 312 that are combined into a single unit.

It should be understood that, in the encoder 20 and the decoder 30, a processing result of a current step may be further processed and then output to a next step. For example, after interpolation filtering, motion vector derivation or loop filtering, a further operation, such as a clip or shift operation, may be performed on a processing result of the interpolation filtering, motion vector derivation, or loop filtering.

It should be noted that further operations may be performed on the derived motion vectors of a current block (including but not limit to control point motion vectors in an affine mode, sub-block motion vectors in affine, planar, and ATMVP modes, temporal motion vectors, and so on). For example, the value of the motion vector is constrained to a predefined range based on a representation bit of the motion vector. If the representation bit of the motion vector is bitDepth, the range is from $-2^{(bitDepth-1)}$ to $2^{(bitDepth-1)}-1$, where the "^" represents exponentiation. For example, if bitDepth is set to 16, the range is from $-32768$ to $32767$, or if bitDepth is set to 18, the range is from $-131072$ to $131071$. For example, the value of the derived motion vector (for example, the MVs of four 4×4 sub-blocks in one 8×8 block) is constrained such that a maximum difference between integer parts of the MVs of the four 4×4 sub-blocks does not exceed N pixels, for example, does not exceed one pixel. Two methods for constraining the motion vector based on the bitDepth are provided herein.

Although video coding is mainly described in the foregoing embodiments, it should be noted that the embodiments of the coding system 10, the encoder 20, and the decoder 30 and other embodiments described in this specification may also be used for still picture processing or coding, that is, processing or coding of a single picture independent of any preceding or consecutive pictures in video coding. In general, only the inter prediction units 244

(encoder) and 344 (decoder) may not be available in case the picture processing is limited to a single picture 17. All other functions (also referred to as tools or technologies) of the video encoder 20 and the video decoder 30 may also be used for still picture processing, for example, residual calculation 204/304, transform 206, quantization 208, inverse quantization 210/310, (inverse) transform 212/312, partitioning 262/362, intra prediction 254/354, and/or loop filtering 220/320, entropy encoding 270, and entropy decoding 304.

FIG. 5 is an example block diagram of a video coding device 500 according to an embodiment of the present disclosure. The video coding device 500 is applicable to implementing the disclosed embodiments described in this specification. In an embodiment, the video coding device 500 may be a decoder such as the video decoder 30 in FIG. 1a or an encoder such as the video encoder 20 in FIG. 1a.

The video coding device 500 includes: ingress ports 510 (or input ports 510) and a receiver unit (Rx) 520 for receiving data; a processor, a logic unit, or a central processing unit (CPU) 530 for processing the data, where for example, the processor 530 herein may be a neural network processing unit 530; a transmitter unit (Tx) 540 and egress ports 550 (or output ports 550) for transmitting the data; and a memory 560 for storing the data. The video coding device 500 may also include optical-to-electrical (OE) components and electrical-to-optical (EO) components coupled to the ingress ports 510, the receiver unit 520, the transmitter unit 540, and the egress ports 550 for egress or ingress of optical or electrical signals.

The processor 530 is implemented by hardware and software. The processor 530 may be implemented as one or more processor chips, cores (for example, a multi-core processor), FPGAs, ASICs, and DSPs. The processor 530 communicates with the ingress ports 510, the receiver unit 520, the transmitter unit 540, the egress ports 550, and the memory 560. The processor 530 includes a coding module 570 (for example, a neural network-based coding module 570). The coding module 570 implements the embodiments disclosed above. For example, the coding module 570 implements, processes, prepares, or provides various coding operations. Therefore, the coding module 570 provides a substantial improvement to functions of the video coding device 500 and affects switching of the video coding device 500 to a different state. Alternatively, the coding module 570 is implemented by using instructions stored in the memory 560 and executed by the processor 530.

The memory 560 may include one or more disks, tape drives, and solid-state drives and may be used as an overflow data storage device, to store programs when such programs are selected for execution, and to store instructions and data that are read during program execution. The memory 560 may be volatile and/or nonvolatile and may be a read-only memory (ROM), a random access memory (RAM), a ternary content-addressable memory (TCAM), and/or a static random access memory (SRAM).

Figure 6:
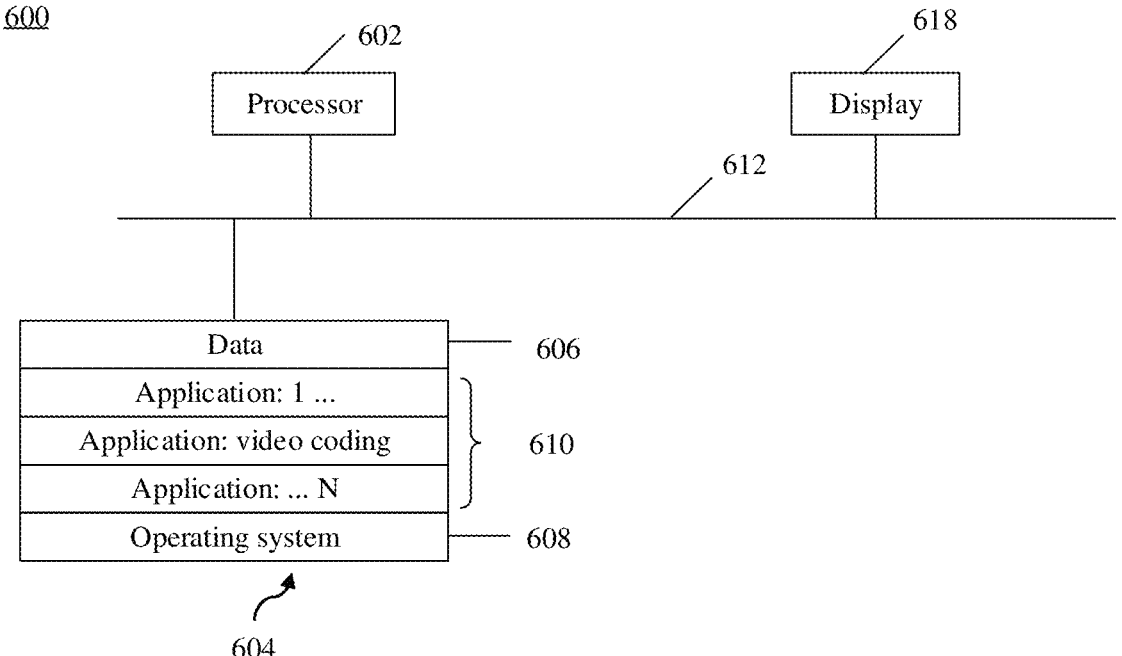
FIG. 6 is an example block diagram of an apparatus according to an embodiment of the present disclosure.

FIG. 6 is an example block diagram of an apparatus 600 according to an embodiment of the present disclosure. The apparatus 600 may be used as either or both of the source device 12 and the destination device 14 in FIG. 1a.

A processor 602 in the apparatus 600 may be a central processing unit. Alternatively, the processor 602 may be any other type of device or a plurality of devices, now-existing or hereafter developed and capable of manipulating or processing information. Although the disclosed implementations can be implemented by using a single processor such as the processor 602 shown in the figure, advantages in speed and efficiency can be achieved by using more than one processor.

In an implementation, a memory 604 in the apparatus 600 may be a read-only memory (ROM) device or a random access memory (RAM) device. Any other appropriate type of storage device may be used as the memory 604. The memory 604 may include code and data 606 that are accessed by the processor 602 through a bus 612. The memory 604 may further include an operating system 608 and an application 610. The application 610 includes at least one program that permits the processor 602 to perform the method described in this specification. For example, the application 610 may include applications 1 to N, and further include a video coding application that performs the method described in this specification.

The apparatus 600 may further include one or more output devices, such as a display 618. In an example, the display 618 may be a touch-sensitive display in which a display is combined with a touch-sensitive element that can be used to sense a touch input. The display 618 may be coupled to the processor 602 through the bus 612.

Although the bus 612 in the apparatus 600 is described in this specification as a single bus, the bus 612 may include a plurality of buses. Further, a secondary storage may be directly coupled to another component of the apparatus 600 or may be accessed through a network and may include a single integrated unit, for example, a memory card, or a plurality of units, for example, a plurality of memory cards. The apparatus 600 can thus be implemented in a wide variety of configurations.

Encoding and decoding methods provided in embodiments of the present disclosure may be applied to various encoding and decoding scenarios.

For example, the encoding and decoding methods provided in embodiments of the present disclosure may be applied to an N-end (that is, N-device) collaborative rendering scene, where N is an integer greater than 1.

In a possible scene, one device may generate rendering input information (the rendering input information may include one or more of a three-dimensional object model (which may also be referred to as a 3D (3-dimension, three-dimensional) object model), probe data, and the like, this is not limited in embodiments of the present disclosure, and in this embodiment, an example in which the rendering input information is probe data is used for description), and then distribute the probe data to the other N–1 devices. After receiving the probe data, in a rendering process, the N–1 devices may determine shading effect on an object (corresponding to the three-dimensional object model) in a three-dimensional scene based on the probe data. After rendering is completed, a rendered picture may be obtained.

In a possible scene, N1 (a value range of N1 is 2 to N, where N1 may be equal to 2 or N, and N1 is an integer) devices may collaboratively generate probe data, where each of the N1 devices generates a part of the probe data. Then, each of the N1 devices distributes the part of the probe data generated by the device to the other N–1 devices. After receiving the probe data, in a rendering process, each of the N1 devices may determine shading effect on an object in a three-dimensional scene based on the received probe data and a part of probe data generated by the device. After rendering is completed, a rendered picture may be obtained. After receiving the probe data, in the rendering process, the N-N1 devices may determine shading effect on the object in the three-dimensional scene based on the received probe data. After rendering is completed, a rendered picture may be obtained.

For ease of description, a device that generates probe data in the N-end collaborative rendering scene may be referred to as a first device, and a device that is used for rendering and that determines shading effect on an object in a three-dimensional scene based on the probe data in a rendering process may be referred to as a second device. A device may be a first device or a second device. This is not limited in the present disclosure. The first device may be a server, or may be a terminal. The second device may be a terminal.

Figure 7A:
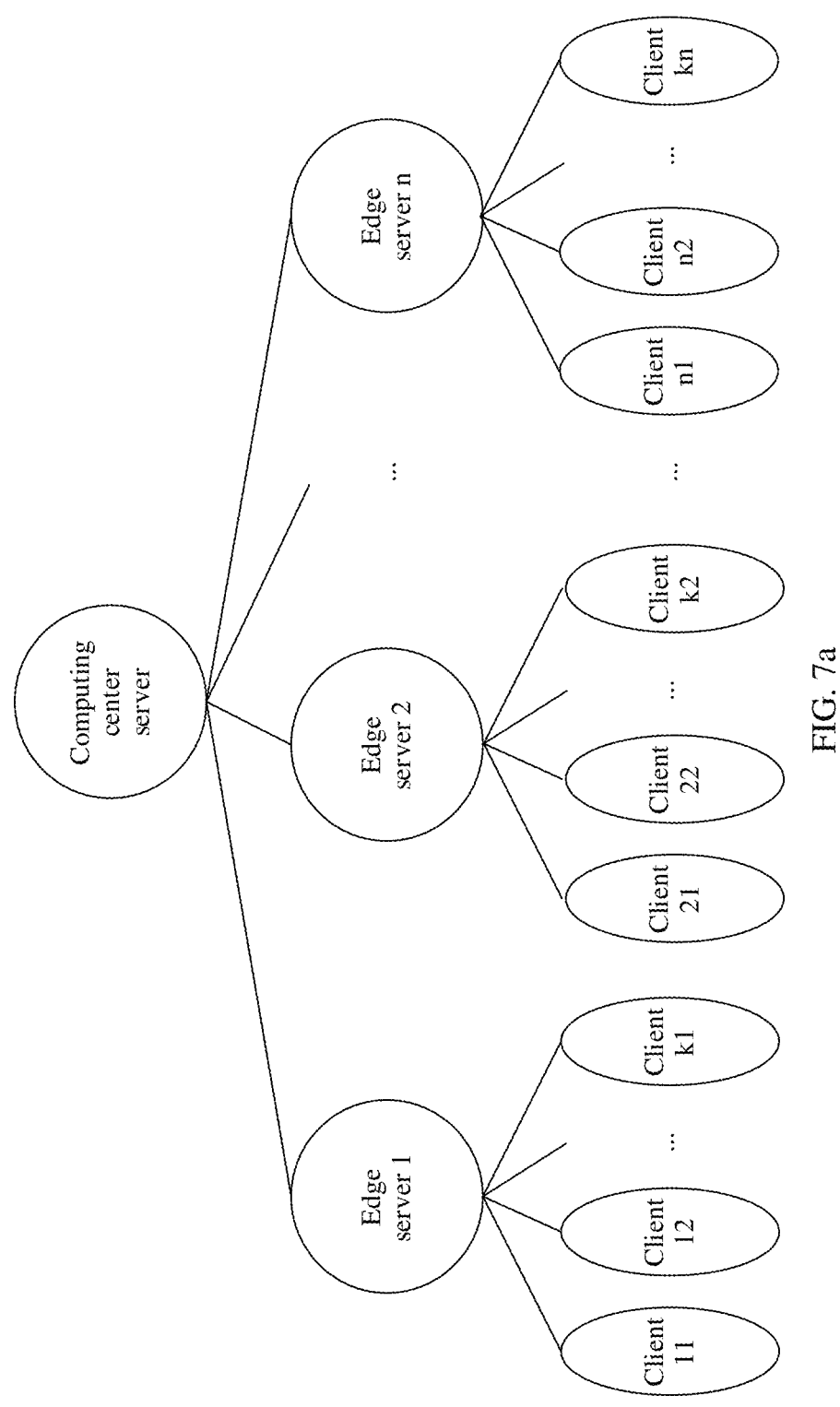
FIG. 7a is a diagram of a framework of a system according to an embodiment of the present disclosure.

FIG. 7a is a diagram of an example of a system framework. In an embodiment of FIG. 7a, the first device is a computing center server disposed in a cloud, and the second device is a client. FIG. 7a is the diagram of the example of the framework of a device-cloud collaborative rendering system.

Refer to FIG. 7a. For example, the device-cloud collaborative rendering system may include the computing center server, an edge server, and a client, where n (n is an integer greater than 1) edge servers may be included, k1+k2+ . . . +kn clients may be included, and k1, k2, . . . , and kn are all positive integers. The computing center server is connected to the n edge servers, and each edge server is connected to at least one client. As shown in FIG. 7a, an edge server 1 is connected to k1 clients: a client 11, a client 12, . . . , and a client k1, an edge server 2 is connected to k2 clients: a client 21, a client 22, . . . , and a client k2, and an edge server n is connected to kn clients: a client n1, a client n2, . . . , and a client kn.

For example, the computing center server may be a server, or may be a server cluster. This is not limited in embodiments of the present disclosure.

For example, a quantity n of edge servers is not limited in embodiments of the present disclosure, and may be set based on an actual application scenario. This is not limited in embodiments of the present disclosure.

For example, a quantity of clients connected to each edge server is not limited in embodiments of the present disclosure, and may be set based on an actual application scenario. In addition, quantities of clients connected to the edge servers may be the same or different (that is, k1, k2, . . . , and kn may be equal or unequal). This may be set based on an actual application scenario. This is not limited in embodiments of the present disclosure either.

For example, the client may include but is not limited to a terminal device such as a personal computer, a mobile phone, or a VR (virtual reality) wearable device.

It should be understood that the framework of the device-cloud collaborative rendering system shown in FIG. 7a is merely an example of a framework of a device-cloud collaborative rendering system in this embodiment. In the device-cloud collaborative rendering system in this embodiment, a computing center server and an edge server may be a same server. Alternatively, the device-cloud collaborative rendering system in this embodiment does not include an edge server, but a computing center server is connected to each client. This is not limited in embodiments of the present disclosure. In this embodiment, the framework of the device-cloud collaborative rendering system shown in FIG. 7a is used as an example for description.

For example, the computing center server may be configured to generate probe data.

For example, the edge server may be configured to distribute the probe data.

For example, the client may be configured to perform rendering and display a rendered picture. In a rendering process, shading effect on an object in a three-dimensional scene may be determined based on the probe data.

For example, multi-end collaborative rendering scene such as cloud gaming, cloud exhibition, indoor decoration, a clothing design, and an architectural design all may be implemented by using the framework of the device-cloud collaborative rendering system shown in FIG. 7a.

For example, in the cloud gaming scene, after receiving a field of view switching indication sent by the client 11, the computing center server may generate probe data of a gaming scene corresponding to a target field of view, and then send the probe data to the edge server 1; and the edge server 1 sends the probe data to the client 11. After receiving the probe data, the client 11 may perform rendering, and determine, based on the received probe data in a rendering process, shading effect on an object in the gaming scene corresponding to the target field of view. After rendering is completed, a picture of the gaming scene corresponding to the target field of view may be obtained and displayed.

For example, in the indoor decoration scene, after receiving a furniture adding indication sent by the client 21, the computing center server may generate probe data corresponding to a living room scene to which target furniture is added, and then send the probe data to the edge server 2; and the edge server 2 sends the probe data to the client 21. After receiving the probe data, the client 21 may perform rendering, and determine, based on the received probe data in a rendering process, shading effect on an object in the living room scene to which the target furniture is added. After rendering is completed, a picture of the living room to which the target furniture is added may be obtained and displayed.

For ease of subsequent description, the following describes a process in which the computing center server generates the probe data and a process in which the client determines the shading effect on the object in the three-dimensional scene based on the probe data in the rendering process.

The process in which the computing center server generates the probe data is as follows.

For example, the rendering process of the computing center server may be as follows: A three-dimensional object model (which may include a model of a person or a model of an object) is loaded to a three-dimensional scene (which may also be referred to as a 3D scene) (therefore, the three-dimensional object model can be converted into an object in the three-dimensional scene), and then the object in the three-dimensional scene may be rendered to obtain a current frame (that is, a rendered picture). In a process of rendering the object in the three-dimensional scene, a plurality of probes may be placed in the three-dimensional scene, an ambient environment is detected by using the probes, to obtain probe data, and then shading effect on the object in the three-dimensional scene is determined based on the probe data, so as to simulate the shading effect on the object in the three-dimensional scene after a light ray in the three-dimensional scene is reflected for a plurality of times.

Figure 7B:
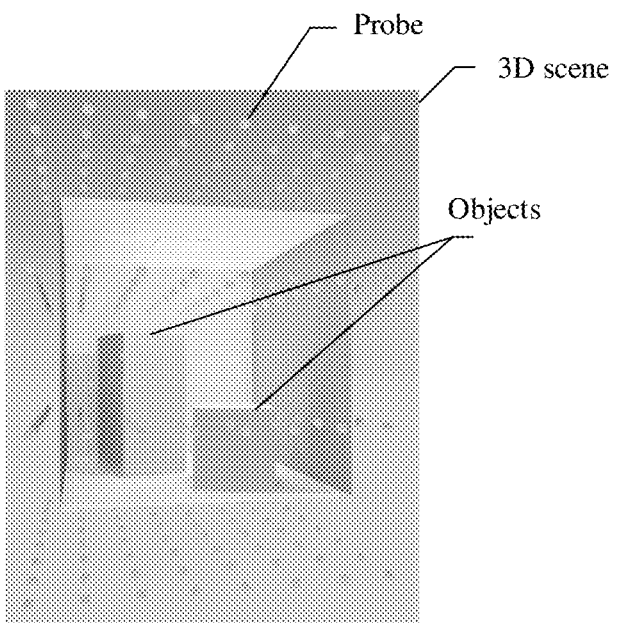
FIG. 7b is a diagram of probe distribution in a three-dimensional scene according to an embodiment of the present disclosure.

FIG. 7b is a diagram of an example of probe distribution in a three-dimensional scene. Each ball in FIG. 7b represents a probe. In an embodiment of FIG. 7b, the probe is a DDGI probe.

Refer to FIG. 7b. For example, a position at which each probe is placed in the three-dimensional scene and a position relationship between each probe and another probe may be set based on a requirement. This is not limited in embodiments of the present disclosure. For example, in FIG. 7b, distances between each probe and six probes in six directions (at the upper side, the lower side, the front side, the rear side, the left side, and the right side) around the probe are equal. In addition, a quantity of probes placed in the three-dimensional scene may also be set based on a requirement. This is not limited in embodiments of the present disclosure either.

After a plurality of probes are placed in the three-dimensional scene, corresponding attribute data (the attribute data is used in a rendering process) may be configured for each probe based on a scene requirement. The attribute data includes but is not limited to: a probe type (such as a reflection probe or a DDGI probe), a probe enable identifier, a probe position, a probe position offset (for example, after the probes are placed in a preset manner, initial positions of the probes may be obtained, and positions of some probes may be adjusted to obtain better shading effect, and therefore, for each of these probes, an offset between an adjusted position and the initial position may be referred to as a probe position offset, for example, after the probes are placed in a manner shown in FIG. 1b, distances between each probe and six probes around the probe are equal; or if a position of one probe is adjusted, distances between the probe and six probes around the probe are unequal), and the like. This is not limited in the present disclosure.

For example, after the plurality of probes are placed in the three-dimensional scene, each probe may detect a probe-centered ambient environment, that is, detect features of probe-centered objects in the three-dimensional scene, and record these features as environment data of the probe. Ambient environment data includes at least one of illumination data, a color, visibility data, a material, a normal direction, or texture coordinates. The illumination data may be used to describe emergent illumination of an object around the probe. The visibility data, that is, distribution data of distances between the probe and the objects at all angles, includes data such as an average value of distances corresponding to each angle, squares of the distances, and a variance of the distances.

For example, illumination data and visibility data that correspond to each probe may be generated according to a DDGI algorithm. The following uses one probe in a current frame as an example to describe a process of generating illumination data and visibility data of the probe. First, several light rays emitted from the probe are sampled, and first intersection points between the several light rays and objects in the three-dimensional scene are calculated. Then, a distance between the probe and a first intersection point between each of the several light rays of the probe and the objects in the three-dimensional scene is calculated, to obtain initial distance data; and illumination at the first intersection point between each of the several light rays and the objects in the three-dimensional scene is calculated, to obtain initial illumination data. Subsequently, the initial distance data may be converted into spherical data in a continuous domain from a discrete domain. Specifically, filtering processing may be performed on the initial distance data on the spherical surface according to the cos^k kernel function (k is a positive integer), to obtain candidate distance data. In addition, the initial distance data may be converted into the spherical data in the continuous domain from the discrete domain. Similarly, filtering processing may be performed on a square of the initial distance data on the spherical surface according to the cos^k kernel function (k is a positive integer), to obtain a square of the candidate distance data. In addition, the initial illumination data may be converted into spherical data in a continuous domain from a discrete domain. Specifically, filtering processing may be performed on the initial illumination data on the spherical surface according to the cos^k kernel function (k is a positive integer), to obtain candidate illumination data. Then, weighted calculation is performed on the candidate distance data of the probe and distance data of the probe in a previous frame, to obtain distance data of the probe in the current frame. Weighted calculation is performed on the square of the candidate distance data of the probe and a square of the distance data of the probe in the previous frame, to obtain a square of the distance data of the probe in the current frame; and weighted calculation is performed on the candidate illumination data of the probe and illumination data of the probe in the previous frame, to obtain the illumination data of the probe in the current frame. Therefore, illumination data and visibility data of all probes in the current frame may be obtained.

For example, attribute data and environment data that are used in the rendering process may form probe data of a probe.

For example, illumination data and visibility data of each probe may be represented by a two-dimensional picture, may be represented by a spherical harmonic function basis coefficient, or may be represented by a spherical wavelet basis coefficient. This is not limited in the present disclosure.

It should be noted that, it is assumed that the three-dimensional scene includes M (M is a positive integer) probes, where M1 probes have any one of illumination data, visibility data, and attribute data, M2 probes have any two of illumination data, visibility data, and attribute data, M3 probes have illumination data, visibility data, and attribute data, and M4 probes have no probe data. M1+M2+M3+M4=M, M1, M2, M3, and M4 are all integers, and values of M1, M2, M3, and M4 may be set based on a requirement. This is not limited in embodiments of the present disclosure.

The process in which the client determines the shading effect on the object in the three-dimensional scene based on the probe data in the rendering process is as follows.

For example, in the rendering process of the client, the probe data is used to calculate the shading effect on the object in the three-dimensional scene. Specifically, when each pixel is rendered, coordinates of 3D space corresponding to the pixel are first obtained, and then eight probes around the coordinates are searched for. Then, a contribution weight of each probe to the pixel is calculated based on visibility data of the probe, that is, whether the probe and 3D coordinates of the probe are visible to each other is determined based on a distance. If the probe and the 3D coordinates are invisible to each other, the weight is 0. If the probe and the 3D coordinates are visible to each other, the contribution weight of the probe is calculated based on a square of the distance. Then, weighted averaging is performed on illumination data of the probe based on the contribution weight, to obtain a shading result on the pixel.

Because an amount of data of probe data is large, the computing center server can compress the probe data and then send the probe data to the client, to reduce a network bandwidth.

Figure 8A:
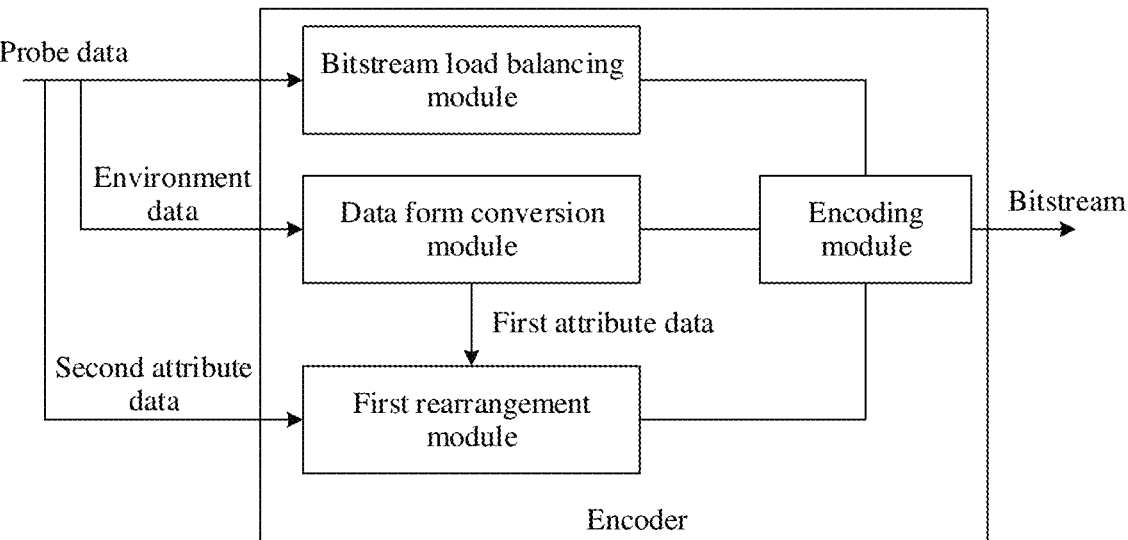
FIG. 8a is a diagram of an encoding framework according to an embodiment of the present disclosure.

FIG. 8a is a diagram of an example of an encoding framework.

Refer to FIG. 8a. For example, an encoder may include a bitstream load balancing module, a data form conversion module, a first rearrangement module, and an encoding module.

For example, the bitstream load balancing module may be configured to determine a target bit rate and an encoding scheme (for example, intra coding or inter coding) of probe data.

For example, the data form conversion module may be configured to: perform data form conversion on environment data, to convert the environment data into a more compact representation; or increase a quantity of bits occupied in a bitstream by data that is of higher importance and that is required in a rendering process.

For example, the first rearrangement module may be configured to rearrange attribute data of a probe.

The attribute data of the probe may include attribute data (hereinafter referred to as first attribute data) used for data form conversion and attribute data (hereinafter referred to as second attribute data) used in the rendering process.

For example, the encoding module is configured to perform encoding, to obtain a bitstream.

It should be noted that steps performed by the bitstream load balancing module, the data form conversion module, and the first rearrangement module are included in steps in an encoding procedure of the encoder.

It should be understood that FIG. 8*a* shows merely an example of the encoder in this embodiment, and the encoder in this embodiment may have fewer modules than those in FIG. 8*a*. For example, the encoder includes a bitstream load balancing module, a data form conversion module, and an encoding module. For another example, the encoder includes a data form conversion module, a first rearrangement module, and an encoding module. For still another example, the encoder includes a data form conversion module and an encoding module. In addition, the encoder in this embodiment may have more modules than those in FIG. 8*a*. This is not limited in embodiments of the present disclosure.

It should be understood that the bitstream load balancing module, the data form conversion module, the first rearrangement module, and the encoding module in FIG. 8*a* may be modules independent of each other, or any two or more of the modules are an entirety. This is not limited in embodiments of the present disclosure. In addition, the bitstream load balancing module, the data form conversion module, the first rearrangement module, and the encoding module are logical modules. The encoder may be further divided into other modules or these modules have other names. This is also not limited in embodiments of the present disclosure.

It should be understood that the encoder includes only the encoding module, the bitstream load balancing module, the data form conversion module, and the first rearrangement module, that may be independent of the encoder. This is not limited in embodiments of the present disclosure. In this embodiment, the encoder in FIG. 8*a* is used as an example for description.

Figure 8B:
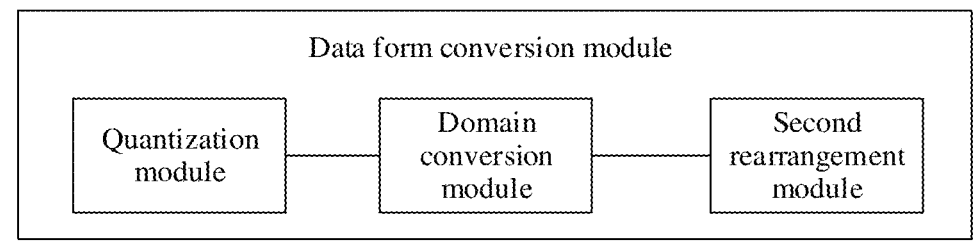
FIG. 8b is a diagram of a structure of a data form conversion module according to an embodiment of the present disclosure.

FIG. 8*b* is a diagram of an example of a structure of a data form conversion module.

Refer to FIG. 8*b*. For example, the data form conversion module may include a quantization module, a domain conversion module, and a second rearrangement module.

For example, the quantization module may be configured to perform quantization.

For example, the domain conversion module may be configured to perform domain conversion.

For example, the domain conversion may be converting a representation form of data from one domain to another domain. A domain may be classified from different perspectives based on a requirement. For example:

From a perspective of normalization, the domain may be classified into a normalized domain and a non-normalized domain.

From a perspective of color space, the domain can be classified into an RGB domain, a YUV domain, an XYZ domain, and a Lab domain.

From a perspective of a value change curve, the domain may be classified into a linear domain and a non-linear domain, where the non-linear domain may be an exponential domain, a PQ (perceptual quantization) domain, an HLG (hybrid log gamma) domain, or the like.

From a perspective of a value representation form, the domain may be classified into a picture domain and a transform domain. For example, the picture domain may be a domain represented by a picture. For example, the transform domain may be a domain represented by a basis function and a corresponding coefficient. Data $Y(t)$ in a transform basis domain may be approximated based on x bases $e\_1(t)$ to $e\_x(t)$, so that the data $Y(t)$ is approximately equal to a sum of x transform bases multiplied by a corresponding transform coefficient. The transform basis includes but is not limited to a spherical harmonic function basis, a spherical wavelet basis, an eigenvector, and the like. This is not limited in the present disclosure.

For example, the second rearrangement module may be configured to rearrange data.

It should be understood that FIG. 8*b* is merely an example of the data form conversion module in this embodiment. The data form conversion module in this embodiment may have fewer modules than those in FIG. 8*b*. For example, the data form conversion module includes only a domain conversion module. For another example, the data form conversion module includes only a quantization module and a domain conversion module. For another example, the data form conversion module includes only a domain conversion module and a second rearrangement module. This is not limited in embodiments of the present disclosure. In addition, the data form conversion module in this embodiment may have more modules than those in FIG. 8*b*. This is also not limited in embodiments of the present disclosure.

It should be understood that the quantization module, the domain conversion module, and the second rearrangement module in FIG. 8*b* may be modules independent of each other, or any two or more of the modules are an entirety. This is not limited in embodiments of the present disclosure. In addition, the quantization module, the domain conversion module, and the second rearrangement module are logical modules, and the data form conversion module may be further divided into other modules or these modules have other names. This is also not limited in embodiments of the present disclosure.

Figure 9A:
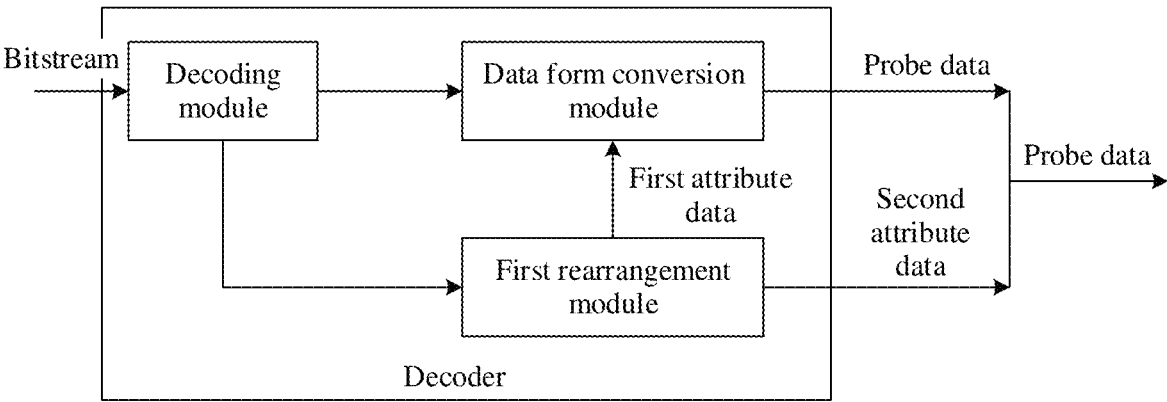
FIG. 9a is a diagram of a decoding framework according to an embodiment of the present disclosure.

FIG. 9*a* is a diagram of an example of a decoding framework. In an embodiment of FIG. 9*a*, the decoding framework corresponding to the encoding framework in FIG. 8*a* is described.

Refer to FIG. 9*a*. For example, a decoder may include a data form conversion module, a first rearrangement module, and a decoding module.

For example, the data form conversion module may be configured to perform data form conversion on a part of data obtained by decoding a bitstream, to obtain probe data.

For example, the first rearrangement module may be configured to rearrange the other part of data obtained by decoding the bitstream, to obtain attribute data of a probe. The attribute data of the probe may include attribute data (hereinafter referred to as first attribute data) used for data form conversion and attribute data (hereinafter referred to as second attribute data) used in a rendering process.

For example, the decoding module is configured to decode the bitstream.

It should be understood that a data form conversion process of the data form conversion module in the decoder is an inverse process of a data form conversion process of a data form conversion module in an encoder. A rearrangement process of the first rearrangement module in the decoder is an inverse process of a rearrangement process of a first rearrangement module in the encoder.

It should be noted that steps performed by the data form conversion module and the first rearrangement module are included in steps in a decoding procedure of the decoder.

It should be understood that FIG. 9a is merely an example of the decoder in this embodiment. The decoder in this embodiment may have fewer modules than those in FIG. 9a. For example, the decoder includes a data form conversion module and a decoding module. This is not limited in embodiments of this application. Alternatively, the decoder in this embodiment may have more modules than those shown in FIG. 9a. This is not limited in embodiments of the present disclosure.

It should be understood that the data form conversion module, the first rearrangement module, and the decoding module in FIG. 9a may be modules independent of each other, or any two or more of the modules are an entirety. This is not limited in embodiments of the present disclosure. In addition, the data form conversion module, the first rearrangement module, and the decoding module are logical modules. The decoder may be further divided into other modules or these modules have other names. This is also not limited in embodiments of the present disclosure.

It should be understood that the decoder includes only the decoding module, the data form conversion module, and the first rearrangement module, that may be independent of the decoder. This is not limited in embodiments of the present disclosure. In this embodiment, the decoder in FIG. 9a is used as an example for description.

Figure 9B:
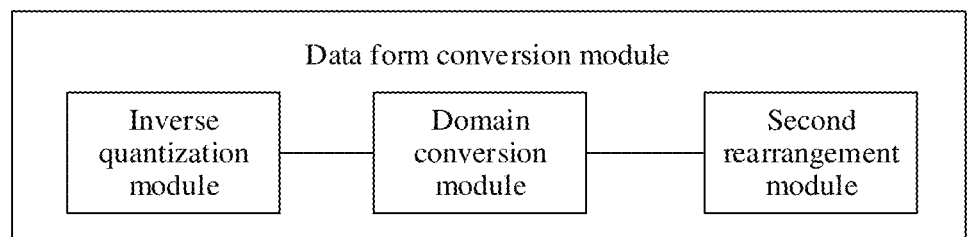
FIG. 9*b* is a diagram of a structure of another data form conversion module according to an embodiment of the present disclosure.

FIG. 9b is a diagram of an example of a structure of a data form conversion module.

Refer to FIG. 9b. For example, the data form conversion module may include an inverse quantization module, a domain conversion module, and a second rearrangement module.

For example, the inverse quantization module may be configured to perform inverse quantization. It should be understood that an inverse quantization process of the inverse quantization module in the decoder is an inverse process of a quantization process of a quantization module in an encoder.

For example, the domain conversion module may be configured to perform domain conversion. It should be understood that a domain conversion process of the domain conversion module in the decoder is an inverse process of a domain conversion process of a domain conversion module in the encoder.

For example, the second rearrangement module may be configured to rearrange data. It should be understood that a rearrangement process of the second rearrangement module in the decoder is an inverse process of a rearrangement process of a second rearrangement module in the encoder.

It should be understood that FIG. 9b is merely an example of the data form conversion module in this embodiment, and the data form conversion module in this embodiment may have fewer modules than those in FIG. 9b. For example, the data form conversion module includes only an inverse quantization module and a domain conversion module, or the data form conversion module includes only a domain conversion module and a second rearrangement module. This is not limited in embodiments of the present disclosure. Alternatively, the data form conversion module in this embodiment may have more modules than those in FIG. 9b. This is not limited in embodiments of the present disclosure.

It should be understood that the inverse quantization module, the domain conversion module, and the second rearrangement module in FIG. 9b may be modules independent of each other, or any two or more of the modules are an entirety. This is not limited in embodiments of the present disclosure. In addition, the inverse quantization module, the domain conversion module, and the second rearrangement module are logical modules, and the data form conversion module may be further divided into other modules or these modules have other names. This is also not limited in embodiments of the present disclosure.

Figure 10:
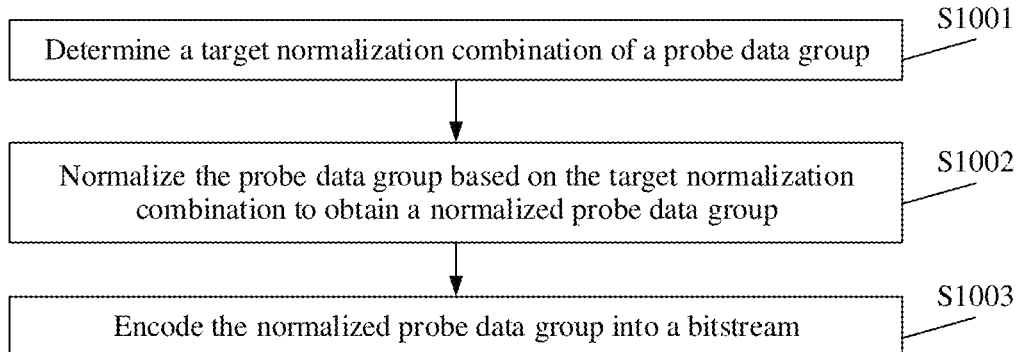
FIG. 10 is a schematic flowchart of an encoding method according to an embodiment of the present disclosure.
Figure 11:
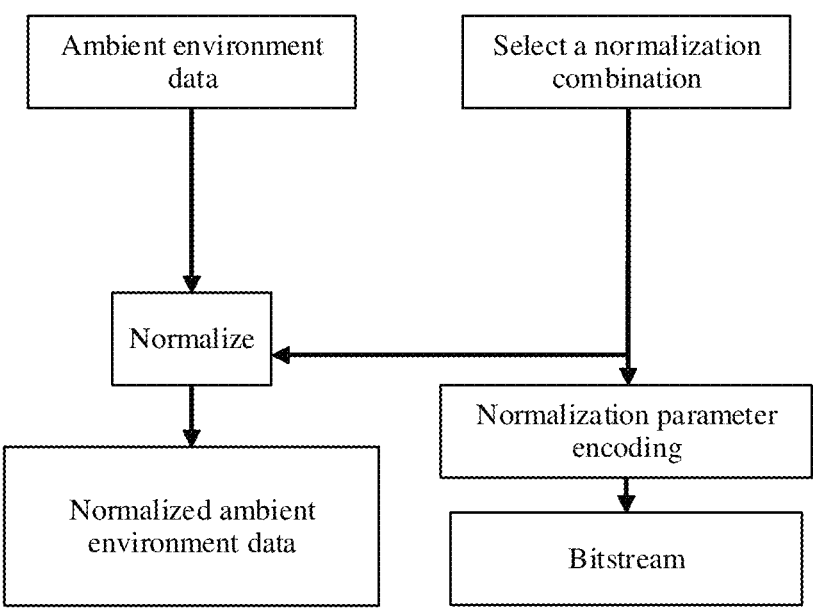
FIG. 11 is a schematic flowchart of another encoding method according to an embodiment of the present disclosure.

FIG. 10 and FIG. 11 are flowcharts of an encoding method according to an embodiment of the present disclosure. The encoding method may be performed by the foregoing encoder. The encoding method is described as a series of steps or operations. It should be understood that the encoding method may be performed in various sequences and/or simultaneously, and is not limited to an execution sequence shown in FIG. 10. As shown in FIG. 10 and FIG. 11, the encoding method may include the following steps.

S1001: Determine a target normalization combination of a probe data group.

The target normalization combination is a normalization combination minimizes a rendering loss corresponding to the probe data group among a plurality of normalization combinations, and the target normalization combination includes a target normalization method and a target normalization parameter. The rendering loss corresponding to the probe data group may be an error between rendering effect corresponding to the probe data group and rendering effect corresponding to the probe data group after encoding and decoding. For example, the rendering loss may be measured based on a PSNR, or may be measured based on an MSE or another parameter. This is not limited in embodiments of the present disclosure.

The probe data group may include probe data of a single line of probes in one or more frames, probe data of a single probe in one or more frames, probe data of a single channel of probes in one or more frames, or probe data of all probes in one or more frames. Probe data corresponds to one or more probes in a three-dimensional scene, is used to determine shading effect on an object in the three-dimensional scene in a rendering process, and may include attribute data and ambient environment data. The ambient environment data in the probe data indicates attribute data in different directions at each probe, such as illumination data, a color, visibility data, a material, a normal direction, and texture coordinates. The attribute data in the probe data may include a probe type, whether a probe is enabled, a probe position, an offset of the probe relative to an initial position, a parameter used in an encoding process of the ambient environment data, and the like. Details are not listed herein.

For example, in a cloud gaming scene, after receiving a field of view switching indication sent by a client, a computing center server may detect an ambient environment by using a plurality of probes placed in the cloud gaming scene, to generate probe data of the gaming scene corresponding to a target field of view, and then send a probe data group including the probe data to an edge server. The edge server determines a target normalization combination of the probe data group.

For another example, in an indoor decoration scene, after receiving a furniture adding indication sent by a client, a computing center server may detect an ambient environment by using a plurality of probes placed in the indoor decoration scene, to generate probe data corresponding to a living room scene to which target furniture is added, and then send a probe data group including the probe data to an edge server. The edge server determines a target normalization combination of the probe data group.

Figure 12:
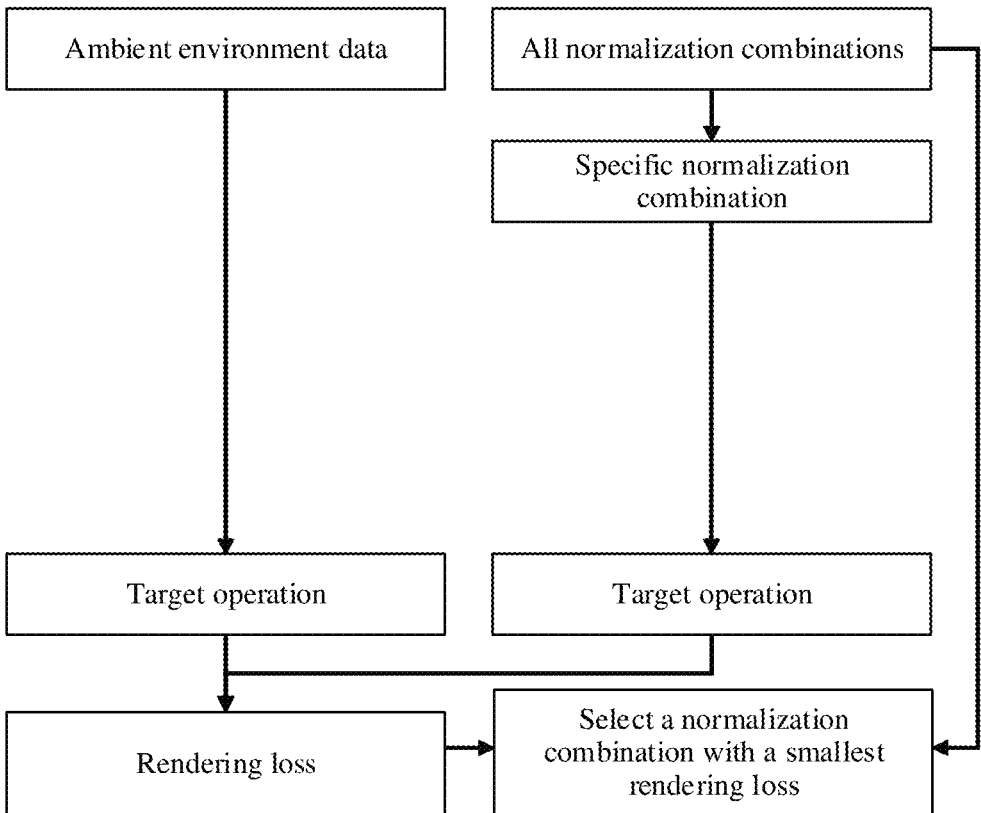
FIG. 12 is a schematic flowchart of a rendering loss determining method according to an embodiment of the present disclosure.

As shown in FIG. 12, in a possible implementation, a rendering loss that corresponds to each of the plurality of normalization combinations and that corresponds to the probe data group may be first determined. Then, the normalization combination that is in the plurality of normalization combinations and that minimizes the rendering loss corresponding to the probe data group is determined to be the target normalization combination.

In a possible implementation, a target operation may be first performed on the probe data group based on each normalization combination, to obtain a rendering result of the normalization combination on each probe data group. Then, the rendering loss that corresponds to each normalization combination and that corresponds to the probe data group is determined based on a rendering result obtained by rendering the probe data group through the target operation and a rendering result obtained by rendering the probe data group without the target operation. The target operation includes normalization, coding, and denormalization.

A specific coding method may be any method that can be figured out by persons skilled in the art for processing. This is not limited in embodiments of the present disclosure. For example, a specific coding method may be HEVC, analog coding, low resolution coding, and fast coding, and the like.

Optionally, the plurality of normalization combinations may be normalization combinations including a min-max normalization method and a plurality of normalization parameters.

$$\frac{\max(m, \min(x, M)) - m}{M - m},$$

where M is a maximum normalization parameter, and m is a minimum normalization parameter.

In a possible implementation, the method may further include: determining a normalization parameter in the plurality of normalization combinations based on a reference target normalization parameter, where the reference target normalization parameter is a target normalization parameter of a probe data group related to the probe data group.

For example, a plurality of values may be selected from a range of $1/(1+\epsilon)$ times to $1+\epsilon$ times the reference target normalization parameter as normalization parameters in the plurality of normalization combinations. $\epsilon$ may range from 0.01 to 0.05.

Optionally, the target normalization parameter (for example, M and m) of the probe data group in a current frame may range from $1/(1+\epsilon)$ times to $1+\epsilon$ times the target normalization parameter of the probe data group in a previous frame.

For example, it is assumed that a target normalization parameter M of the probe data group in the previous frame of the current frame is 1 and e is 0.01, a lower limit of a value range of the target normalization parameter M of the probe data group in the current frame is $1/(1+0.01)*1\approx0.99$, and an upper limit of the value range of the target normalization parameter M of the probe data in the current frame is $(1+0.01)*1=1.01$, that is, the value range of the target normalization parameter M of the probe data in the current frame is 0.99 to 1.01.

Optionally, the plurality of normalization parameters in the plurality of normalization combinations may be 1.

S1002: Normalize the probe data group based on the target normalization combination to obtain a normalized probe data group.

For example, in a cloud gaming scene, after receiving a field of view switching indication sent by a client, a computing center server may detect an ambient environment by using a plurality of probes placed in the cloud gaming scene, to generate probe data of the gaming scene corresponding to a target field of view, and then send a probe data group including the probe data to an edge server. The edge server determines a target normalization combination of the probe data group, and then normalizes the probe data group based on the target normalization combination to obtain a normalized probe data group.

For another example, in an indoor decoration scene, after receiving a furniture adding indication sent by a client, a computing center server may detect an ambient environment by using a plurality of probes placed in the indoor decoration scene, to generate probe data corresponding to a living room scene to which target furniture is added, and then send a probe data group including the probe data to an edge server. The edge server determines a target normalization combination of the probe data group, and then normalizes the probe data group based on the target normalization combination to obtain a normalized probe data group.

The probe data group is normalized based on the target normalization combination to obtain the normalized probe data group. This may be performed by using any method that can be thought of by persons skilled in the art.

For example, when the target normalization method in the target normalization combination is preset maximum value normalization, the probe data group is normalized using the preset maximum value normalization and the target normalization parameter, to obtain the normalized probe data group.

For another example, when the target normalization method in the target normalization combination is min-max normalization, the probe data group is normalized using the min-max normalization and the target normalization parameter, to obtain the normalized probe data group.

For another example, when the target normalization method in the target normalization combination is Z-Score normalization, the probe data group is normalized using the Z-Score normalization and the target normalization parameter, to obtain the normalized probe data group.

S1003: Encode the normalized probe data group into a bitstream.

For example, in the cloud gaming scene, after obtaining the normalized probe data group of the gaming scene, the edge server may encode the data group into a bitstream of the gaming scene.

For another example, in the indoor decoration scene, after obtaining the normalized probe data group corresponding to the living room scene, the edge server may encode the data group into a bitstream of the living room scene.

In a possible implementation, the target normalization combination may be further encoded into the bitstream.

In a possible implementation, a normalization parameter variation of the probe data group may be further determined based on the target normalization parameter of the probe data group and the reference target normalization parameter, and the normalization parameter variation is encoded into the bitstream. The reference target normalization parameter is the target normalization parameter of the probe data group related to the probe data group.

For example, when the probe data group is a probe data group coded in an intra coding scheme, the target normalization combination is encoded into the bitstream.

In a possible implementation, the method may further include: sending normalization information, where the normalization information indicates the target normalization combination.

In a possible implementation, a normalization parameter variation of the probe data group may be further determined based on the target normalization parameter of the probe data group and the reference target normalization parameter, and the normalization parameter variation is encoded into the bitstream.

Figure 13:
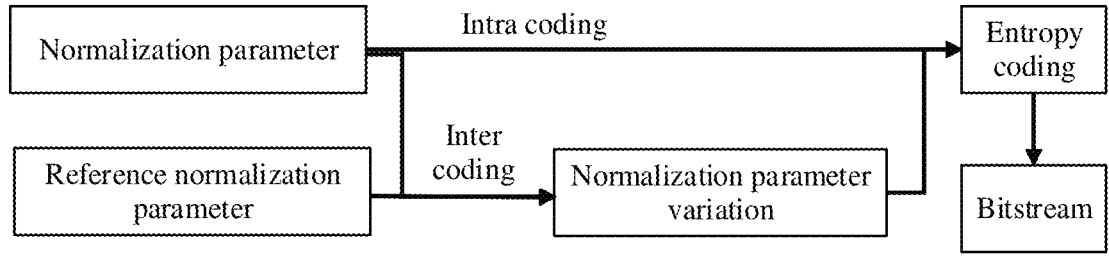
FIG. 13 is a schematic flowchart of encoding according to an embodiment of the present disclosure.

For example, as shown in FIG. 13, when the probe data group is an intra coded probe data group, the target normalization combination may be encoded into the bitstream; or when the probe data group is an inter coded probe data group, the normalization parameter variation may be encoded into the bitstream. Intra coding is a coding scheme in which only information about a current frame is used when the current frame is coded. For example, HEVC intra coding may be used for intra coding of the probe data group. Inter coding is a coding scheme in which information about a non-current frame is used when the current frame is coded. For example, HEVC inter coding may be used for inter coding of the probe data group.

In a possible implementation, the normalization parameter variation of the probe data group may be further determined based on the target normalization parameter of the probe data group and the reference target normalization parameter, where the reference target normalization parameter is the target normalization parameter of the probe data group related to the probe data group. First information is encoded into the bitstream, where the first information indicates whether the target normalization parameter of the probe data group is changed compared with the reference target normalization parameter.

For example, when the probe data group is a probe data group coded in an inter coding scheme, the first information may be encoded into the bitstream.

Optionally, the inter coding scheme may be a coding scheme other than the intra coding scheme.

Optionally, the first information may use different flags to indicate whether the target normalization parameter of the probe data group is changed compared with the reference target normalization parameter.

In a possible implementation, the method may further include: when the first information indicates that the target normalization parameter of the probe data group is changed compared with the reference target normalization parameter, encoding the normalization parameter variation into the bitstream.

Figure 14:
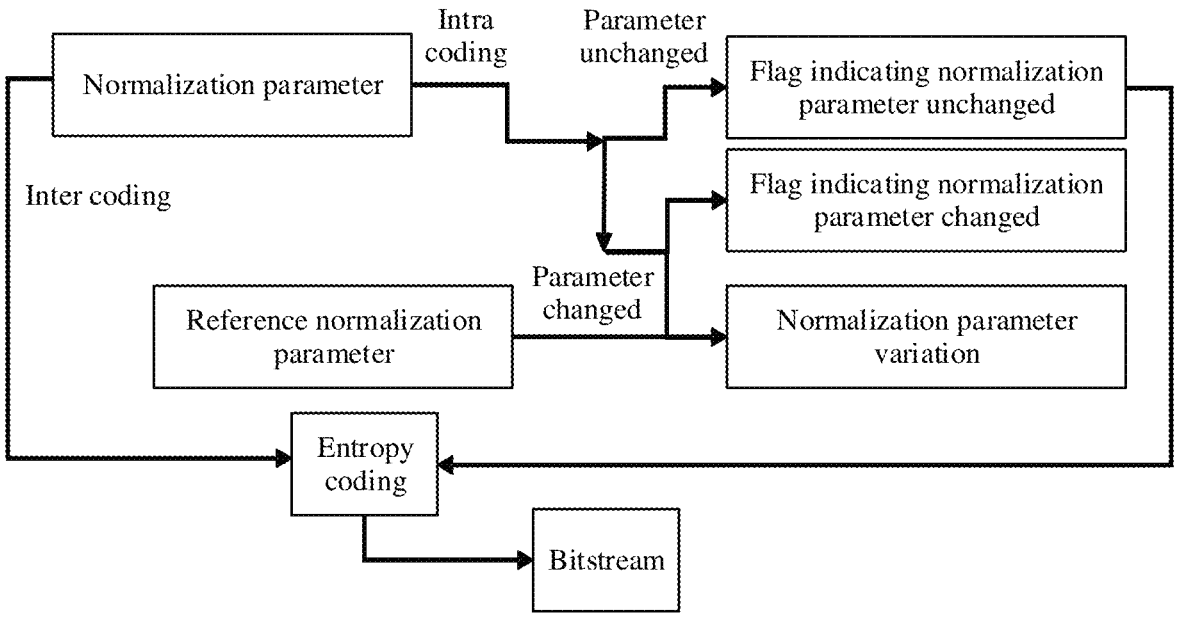
FIG. 14 is another schematic flowchart of encoding according to an embodiment of the present disclosure.

For example, as shown in FIG. 14, when the probe data group is an intra coded probe data group, the target normalization combination may be encoded into the bitstream. Alternatively, when the probe data group is an inter coded probe data group, a flag indicating whether the target normalization parameter is changed is encoded into the bitstream, and when the target normalization parameter of the probe data group is changed compared with the reference target normalization parameter, the normalization parameter variation is encoded into the bitstream.

In a possible implementation, the method may further include: encoding index information into the bitstream. The index information includes an identifier of the probe data group and the normalization parameter variation of the probe data group.

It can be learned that, in the encoding method provided in this embodiment, normalization is performed by selecting a combination that is of a normalization method and a normalization parameter and that minimizes a rendering loss corresponding to the probe data from a plurality of combinations of normalization methods and normalization parameters, instead of using a fixed normalization method and normalization parameter. Compared with using the fixed normalization method and normalization parameter, using the combination that is of the normalization method and the normalization parameter and that minimizes the rendering loss corresponding to the probe data for normalization can reduce the rendering loss caused by compression of the probe data.

FIG. 15 and FIG. 16 are flowcharts of a decoding method according to an embodiment of the present disclosure. The decoding method may be performed by the foregoing decoder. The decoding method is described as a series of steps or operations. It should be understood that the decoding method may be performed in various sequences and/or simultaneously, and is not limited to execution sequences shown in FIG. 15 and FIG. 16. As shown in FIG. 15 and FIG. 16, the decoding method may include the following steps.

S1501: Decode a bitstream to obtain a normalized probe data group.

For example, in a cloud gaming scene, after obtaining a bitstream of a gaming scene, a client may decode the bitstream to obtain a normalized probe data group of the gaming scene.

For another example, in an indoor decoration scene, after obtaining a bitstream of a living room scene, a client may decode the bitstream to obtain a normalized probe data group corresponding to the living room scene.

S1502: Denormalize the normalized probe data group based on a target normalization combination of a probe data group to obtain a second probe data group.

The target normalization combination is a normalization combination that is in a plurality of normalization combinations and that corresponds to a smallest rendering loss corresponding to the first probe data group, the first probe data group is the normalized probe data group before normalization, and the target normalization combination includes a target normalization method and a target normalization parameter.

For example, in the cloud gaming scene, the client may denormalize the normalized probe data group of the gaming scene based on a target normalization combination of a probe data group of the gaming scene, to obtain a probe data group of the gaming scene.

For another example, in the indoor decoration scene, the client may denormalize the normalized probe data group corresponding to the living room scene based on a target normalization combination of a probe data group corresponding to the living room scene, to obtain a probe data group corresponding to the living room scene.

In a possible implementation, the target normalization combination may be further obtained.

In a possible implementation, the target normalization combination may be obtained in a manner of obtaining normalization information. The normalization information indicates the target normalization combination.

In another possible implementation, the bitstream may be decoded to obtain the target normalization combination.

For example, when the normalized probe data group is a probe data group coded in an intra coding scheme, the target normalization combination may be obtained by decoding the bitstream.

In a possible implementation, the bitstream may be further decoded first to obtain a normalization parameter variation of the first probe data group. Then, the target normalization combination is determined based on the normalization parameter variation and a reference normalization combination. The reference normalization combination is a target normalization combination of a probe data group related to the first probe data group.

For example, when the normalized probe data group is a probe data group coded in an inter coding scheme, the normalization parameter variation of the first probe data group may be determined based on the target normalization parameter of the first probe data group and a reference target normalization parameter.

Whether one probe data group is related to a current probe data group may be measured in a plurality of measurement manners. This is not limited in this embodiment. The measurement manners include but are not limited to: calculating a Pearson correlation coefficient between two probe data groups. If the Pearson correlation coefficient is greater than a second preset threshold, it is considered that one of the two probe data groups is correlated with the other group. In addition, a PSNR between two probe data groups may alternatively be calculated. If the PSNR is greater than a preset threshold, it is considered that one of the two probe data groups is correlated with the other group.

In still another possible implementation, the bitstream may be further first decoded to obtain first information. When the first information indicates that the target normalization parameter of the first probe data group is not changed compared with the reference target normalization parameter, the target normalization combination is determined based on a reference normalization combination. The first information indicates whether the target normalization parameter of the first probe data group is changed compared with the reference target normalization parameter, and the reference normalization combination is a target normalization combination of a probe data group related to the first probe data group.

For example, when the normalized probe data group is a probe data group coded in an inter coding scheme, the bitstream may be first decoded to obtain the first information. When the first information indicates that the target normalization parameter of the first probe data group is not changed compared with the reference target normalization parameter, the reference normalization combination is determined to be the target normalization combination.

In still another possible implementation, the bitstream may be further first decoded to obtain first information. When the first information indicates that the target normalization parameter of the first probe data group is changed compared with the reference target normalization parameter, the bitstream is decoded to obtain the normalization parameter variation of the first probe data group, and determine the target normalization combination based on the normalization parameter variation and the reference normalization combination.

For example, when the normalized probe data group is a probe data group coded in the inter coding scheme, the bitstream may be first decoded to obtain the first information. When the first information indicates that the target normalization parameter of the first probe data group is not changed compared with the reference target normalization parameter, the bitstream is decoded to obtain the normalization parameter variation of the first probe data group, and the target normalization combination is determined based on the normalization parameter variation and the reference normalization combination.

S1503: Perform rendering based on the second probe data group.

A specific method for rendering based on the second probe data group may be any method that can be figured out by persons skilled in the art for processing. This is not specifically limited in this embodiment.

For example, in a cloud gaming scene, a client may render a gaming scene based on a probe data group of the gaming scene.

For another example, in an indoor decoration scene, a client may render a living room scene based on a probe data group corresponding to the living room scene.

The following describes an encoding apparatus configured to perform the foregoing encoding method. As shown in FIG. 8a, the encoding apparatus may include a data form conversion module and an encoding module.

The data form conversion module is configured to determine a target normalization combination of a probe data group. The target normalization combination minimizes a rendering loss corresponding to the probe data group among a plurality of normalization combinations, and the target normalization combination includes a target normalization method and a target normalization parameter.

For example, the data form conversion module may be configured to perform S1001 in the foregoing encoding method.

The data form conversion module is further configured to normalize the probe data group based on the target normalization combination to obtain a normalized probe data group.

For example, the data form conversion module may be configured to perform S1002 in the foregoing encoding method.

The encoding module is configured to encode the normalized probe data group into a bitstream.

For example, the encoding module may be configured to perform S1003 in the foregoing encoding method.

In a possible implementation, the data form conversion module is configured to: determine a rendering loss that corresponds to each of the plurality of normalization combinations and that corresponds to the probe data group; and determine the normalization combination that is in the plurality of normalization combinations and that minimizes the rendering loss corresponding to the probe data group to be the target normalization combination.

In a possible implementation, the data form conversion module is configured to: perform a target operation on the probe data group based on each normalization combination, to obtain a rendering result of the normalization combination on each probe data group, where the target operation includes normalization, coding, and denormalization; and determine, based on a rendering result obtained by rendering the probe data group through the target operation and a rendering result obtained by rendering the probe data group without the target operation, the rendering loss that corresponds to each normalization combination and that corresponds to the probe data group.

In a possible implementation, the encoding module is further configured to encode the target normalization combination into the bitstream.

In a possible implementation, the data form conversion module is further configured to determine a normalization parameter variation of the probe data group based on the target normalization parameter of the probe data group and a reference target normalization parameter, where the reference target normalization parameter is a target normalization parameter of a probe data group related to the probe data group.

In a possible implementation, the encoding module is further configured to encode the normalization parameter variation into the bitstream.

In a possible implementation, the encoding module is further configured to encode first information into the bitstream, where the first information indicates whether the target normalization parameter of the probe data group is changed compared with the reference target normalization parameter.

In a possible implementation, the encoding module is further configured to: when the first information indicates that the target normalization parameter of the probe data group is changed compared with the reference target normalization parameter, encode the normalization parameter variation into the bitstream.

In a possible implementation, the encoding module is further configured to encode index information into the bitstream, where the index information includes an identifier of the probe data group and the normalization parameter variation of the probe data group.

In a possible implementation, the data form conversion module is further configured to determine a normalization parameter in the plurality of normalization combinations based on the reference target normalization parameter, where the reference target normalization parameter is the target normalization parameter of the probe data group related to the probe data group.

In a possible implementation, the probe data group includes ambient environment data of a probe, and the ambient environment data includes at least one of illumination data, a color, visibility data, a material, a normal direction, or texture coordinates.

The following describes a decoding apparatus configured to perform the foregoing decoding method. As shown in FIG. 9a, the decoding apparatus may include a data form conversion module and a decoding module.

The decoding module is configured to decode a bitstream to obtain a normalized probe data group.

For example, the decoding module may be configured to perform S1501 in the foregoing decoding method.

The data form conversion module is configured to denormalize the normalized probe data group based on a target normalization combination of a first probe data group to obtain a second probe data group, where the target normalization combination is a normalization combination that is in a plurality of normalization combinations and that corresponds to a smallest rendering loss corresponding to the first probe data group, the first probe data group is the normalized probe data group before normalization, and the target normalization combination includes a target normalization method and a target normalization parameter.

For example, the data form conversion module may be configured to perform S1502 in the foregoing decoding method.

The data form conversion module is further configured to perform rendering based on the second probe data group.

For example, the data form conversion module may be configured to perform S1503 in the foregoing decoding method.

In a possible implementation, the decoding module is further configured to obtain the target normalization combination.

In a possible implementation, the decoding module is configured to decode the bitstream to obtain the target normalization combination.

In a possible implementation, the decoding module is configured to: decode the bitstream to obtain a normalization parameter variation of the first probe data group; and determine the target normalization combination based on the normalization parameter variation and a reference normalization combination, where the reference normalization combination is a target normalization combination of a probe data group related to the first probe data group.

In a possible implementation, the decoding module is configured to: decode the bitstream to obtain first information, where the first information indicates whether the target normalization parameter of the first probe data group is changed compared with a reference target normalization parameter, and the reference target normalization parameter is a target normalization parameter of a probe data group related to the first probe data group; and when the first information indicates that the target normalization parameter of the first probe data group is not changed compared with the reference target normalization parameter, determine the target normalization combination based on a reference normalization combination, where the reference normalization combination is a target normalization combination of the probe data group related to the first probe data group; or when the first information indicates that the target normalization parameter of the first probe data group is changed compared with the reference target normalization parameter, decoding the bitstream to obtain second information, where the second information indicates a normalization parameter variation of the first probe data group, and determining the target normalization combination based on the normalization parameter variation and the reference normalization combination.

An embodiment of the present disclosure further provides an encoding apparatus. The apparatus includes at least one processor. When the at least one processor executes program code or instructions, the foregoing related method steps are implemented to implement the encoding method in the foregoing embodiment.

Optionally, the apparatus may further include at least one memory, and the at least one memory is configured to store the program code or the instructions.

An embodiment of the present disclosure further provides a decoding apparatus. The apparatus includes at least one processor. When the at least one processor executes program code or instructions, the foregoing related method steps are implemented to implement the decoding method in the foregoing embodiment.

Optionally, the apparatus may further include at least one memory, and the at least one memory is configured to store the program code or the instructions.

An embodiment of the present disclosure further provides a computer storage medium. The computer storage medium stores computer instructions. When the computer instructions are run on an encoding apparatus, the encoding apparatus is enabled to perform the foregoing related method steps to implement the encoding and decoding methods in the foregoing embodiments.

An embodiment of the present disclosure further provides a computer program product. When the computer program product runs on a computer, the computer is enabled to perform the foregoing related steps, to implement the encoding and decoding methods in the foregoing embodiments.

An embodiment of the present disclosure further provides a coding apparatus. The apparatus may be a chip, an integrated circuit, a component, or a module. Specifically, the apparatus may include a connected processor and a memory configured to store instructions, or the apparatus includes at least one processor, configured to obtain instructions from an external memory. When the apparatus runs, the processor may execute the instructions, so that the chip performs the encoding and decoding methods in the foregoing method embodiments.

FIG. 17 is a diagram of a structure of a chip 1700. The chip 1700 includes one or more processors 1701 and an interface circuit 1702. Optionally, the chip 1700 may further include a bus 1703.

The processor 1701 may be an integrated circuit chip with a signal processing capability. In an implementation process, the steps of the foregoing encoding method and the decoding method may be implemented by using an integrated logic circuit of hardware in the processor 1701, or by using instructions in a form of software.

Optionally, the processor 1701 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor 1701 may implement or perform the methods and steps that are disclosed in embodiments of the present disclosure. The general-purpose processor may be a microprocessor, or the processor may be any conventional processor or the like.

The interface circuit 1702 may be configured to send or receive data, instructions, or information. The processor 1701 may process data, instructions, or other information received through the interface circuit 1702, and send, through the interface circuit 1702, information obtained after processing.

Optionally, the chip further includes a memory. The memory may include a read-only memory and a random access memory, and provide operation instructions and data for the processor. A part of the memory may further include a nonvolatile random access memory (NVRAM).

Optionally, the memory stores an executable software module or a data structure, and the processor may perform a corresponding operation by invoking operation instructions (where the operation instructions may be stored in an operating system) stored in the memory.

Optionally, the chip may be used in the encoding apparatus or a DOP in embodiments of the present disclosure. Optionally, the interface circuit 1702 may be configured to output an execution result of the processor 1701. For the encoding and decoding methods provided in one or more of embodiments of the present disclosure, refer to the foregoing embodiments.

It should be noted that functions respectively corresponding to the processor 1701 and the interface circuit 1702 may be implemented by using a hardware design, may be implemented by using a software design, or may be implemented in a combination of software and hardware. This is not limited herein.

The apparatus, the computer storage medium, the computer program product, or the chip provided in embodiments are all configured to perform the corresponding methods provided above. Therefore, for beneficial effect that can be achieved by the apparatus, the computer storage medium, the computer program product, or the chip, refer to beneficial effect of the corresponding methods provided above.

It should be understood that sequence numbers of the foregoing processes do not mean execution sequences in all of embodiments of the present disclosure. The execution sequences of the processes should be determined based on functions and internal logic of the processes, and should not be construed as any limitation on the implementation processes of embodiments of the present disclosure.

Persons of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of embodiments of the present disclosure.

It may be clearly understood by persons skilled in the art that, for ease and brevity of description, for a detailed working process of the foregoing system, apparatus, and unit, refer to a corresponding process in the foregoing method embodiments.

In the several embodiments provided in embodiments of the present disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or units may be implemented in electrical, mechanical, or other forms.

The foregoing units described as separate parts may or may not be physically separate, and parts displayed as units may or may not be physical units, may be located at one location, or may be distributed on a plurality of network units. Some or all of the units may be selected based on an actual requirement to achieve the objectives of the solutions of embodiments.

In addition, functional units in all of embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of embodiments of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of the present disclosure. The foregoing storage medium includes any medium that can store program code, such as a USB flash drive, a removable hard disk drive, a read-only memory (ROM), a random access memory (RAM), a magnetic disk, or a compact disc.

The foregoing descriptions are merely specific implementations of embodiments of the present disclosure, but are not intended to limit the protection scope of embodiments of the present disclosure. Any variation or replacement readily figured out by persons skilled in the art within the technical scope disclosed in embodiments of the present disclosure shall fall within the protection scope of embodiments of the present disclosure. Therefore, the protection scope of embodiments of the present disclosure shall be subject to the protection scope of the claims.

What is claimed is:

1. An encoding method, comprising:
determining a target normalization combination of a probe data group, wherein the target normalization combination minimizes a rendering loss corresponding to the probe data group among a plurality of normalization combinations, and the target normalization combination comprises a target normalization method and a target normalization parameter;
normalizing the probe data group based on the target normalization combination to obtain a normalized probe data group; and
encoding the normalized probe data group into a bitstream.

2. The method of claim 1, wherein the determining a target normalization combination of a probe data group comprises:
determining a rendering loss corresponding to each of the plurality of normalization combinations and corresponding to the probe data group; and
determining the normalization combination, among the plurality of normalization combinations, that minimizes the rendering loss corresponding to the probe data group as the target normalization combination.

3. The method of claim 2, wherein the determining a rendering loss corresponding to each of the plurality of normalization combinations and corresponding to the probe data group comprises:
performing a target operation on the probe data group based on each normalization combination, to obtain a rendering result of the normalization combination on each probe data group, wherein the target operation comprises normalization, coding, and denormalization; and
determining, based on a rendering result obtained by rendering the probe data group through the target operation and a rendering result obtained by rendering the probe data group without the target operation, the rendering loss that corresponds to each normalization combination and that corresponds to the probe data group.

4. The method of claim 1, further comprising:
encoding the target normalization combination into the bitstream.

5. The method of claim 1, further comprising:
determining a normalization parameter variation of the probe data group based on the target normalization parameter of the probe data group and a reference target normalization parameter, wherein the reference target normalization parameter is a target normalization parameter of a probe data group related to the probe data group; and
encoding the normalization parameter variation into the bitstream.

6. The method of claim 1, further comprising:
determining a normalization parameter variation of the probe data group based on the target normalization parameter of the probe data group and a reference target normalization parameter, wherein the reference target normalization parameter is a target normalization parameter of a probe data group related to the probe data group; and
encoding first information into the bitstream, wherein the first information indicates whether the target normalization parameter of the probe data group is changed compared with the reference target normalization parameter.

7. The method of claim 6, further comprising:
when the first information indicates that the target normalization parameter of the probe data group is changed compared with the reference target normalization parameter, encoding the normalization parameter variation into the bitstream.

8. The method of claim 5, further comprising:
encoding index information into the bitstream, wherein the index information comprises an identifier of the probe data group and the normalization parameter variation of the probe data group.

9. The method of claim 1, further comprising:
determining a normalization parameter in the plurality of normalization combinations based on a reference target normalization parameter, wherein the reference target normalization parameter is a target normalization parameter of a probe data group related to the probe data group.

10. The method of claim 1, wherein the probe data group comprises ambient environment data of a probe, and the ambient environment data comprises: illumination data, a color, visibility data, a material, a normal direction, and/or texture coordinates.

11. The method of claim 4, wherein the encoding the target normalization combination into the bitstream comprises:
when the probe data group is an intra coded probe data group, encoding the target normalization combination into the bitstream.

12. The method of claim 5, wherein the encoding the normalization parameter variation into the bitstream comprises:
when the probe data group is an inter coded probe data group, encoding the normalization parameter variation into the bitstream.

13. A decoding method, comprising:
decoding a bitstream to obtain a normalized probe data group;
denormalizing the normalized probe data group based on a target normalization combination of a first probe data group to obtain a second probe data group, wherein the target normalization combination minimizes a rendering loss corresponding to the first probe data group among a plurality of normalization combinations, the first probe data group is a probe data group that is normalized to obtain the normalized probe data group, and the target normalization combination comprises a target normalization method and a target normalization parameter; and

performing rendering based on the second probe data group.

14. The method of claim 13, further comprising:
decoding the bitstream to obtain the target normalization combination.

15. The method of claim 13, further comprising:
decoding the bitstream to obtain a normalization parameter variation of the first probe data group; and
determining the target normalization combination based on the normalization parameter variation and a reference normalization combination, wherein the reference normalization combination is a target normalization combination of a probe data group related to the first probe data group.

16. The method of claim 13, further comprising:
decoding the bitstream to obtain first information, wherein the first information indicates whether the target normalization parameter of the first probe data group is changed compared with a reference target normalization parameter, and the reference target normalization parameter is a target normalization parameter of a probe data group related to the first probe data group; and
when the first information indicates that the target normalization parameter of the first probe data group is not changed compared with the reference target normalization parameter, determining the target normalization combination based on a reference normalization combination, wherein the reference normalization combination is a target normalization combination of the probe data group related to the first probe data group; or
when the first information indicates that the target normalization parameter of the first probe data group is changed compared with the reference target normalization parameter, decoding the bitstream to obtain second information, wherein the second information indicates a normalization parameter variation of the first probe data group, and determining the target normalization combination based on the normalization parameter variation and the reference normalization combination.

17. A decoding apparatus, comprising:
a memory configured to store instructions;
at least one processor coupled to the memory, and configured to execute the instructions to cause the decoding apparatus to:
decode a bitstream to obtain a normalized probe data group;
denormalize the normalized probe data group based on a target normalization combination of a first probe data group to obtain a second probe data group, wherein the target normalization combination corresponds to a smallest rendering loss associated with the first probe data group among a plurality of normalization combinations, the first probe data group is a probe data group that is normalized to obtain the normalized probe data group, and the target normalization combination comprises a target normalization method and a target normalization parameter; and
perform rendering based on the second probe data group.

18. The apparatus of claim 17, wherein the at least one processor is further configured to execute the instructions to cause the decoding apparatus to:
decode the bitstream to obtain the target normalization combination.

19. The apparatus of claim 17, wherein the at least one processor is further configured to execute the instructions to cause the decoding apparatus to:
decode the bitstream to obtain a normalization parameter variation of the first probe data group; and
determine the target normalization combination based on the normalization parameter variation and a reference normalization combination, wherein the reference normalization combination is a target normalization combination of a probe data group related to the first probe data group.

20. The apparatus of claim 17, wherein the at least one processor is further configured to execute the instructions to cause the decoding apparatus to:
decode the bitstream to obtain first information, wherein the first information indicates whether the target normalization parameter of the first probe data group is changed compared with a reference target normalization parameter, and the reference target normalization parameter is a target normalization parameter of a probe data group related to the first probe data group; and
when the first information indicates that the target normalization parameter of the first probe data group is not changed compared with the reference target normalization parameter, determine the target normalization combination based on a reference normalization combination, wherein the reference normalization combination is a target normalization combination of the probe data group related to the first probe data group; or
when the first information indicates that the target normalization parameter of the first probe data group is changed compared with the reference target normalization parameter, decode the bitstream to obtain second information, wherein the second information indicates a normalization parameter variation of the first probe data group, and determine the target normalization combination based on the normalization parameter variation and the reference normalization combination.

* * * * *